(12) United States Patent
Namiki et al.

(10) Patent No.: US 8,907,048 B2
(45) Date of Patent: Dec. 9, 2014

(54) PRODUCTION METHOD OF POLYCARBONATE RESIN

(71) Applicant: Mitsubishi Chemical Corporation, Chiyoda-ku (JP)

(72) Inventors: Shingo Namiki, Fukuoka (JP); Takehito Nagao, Fukuoka (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 14/042,102

(22) Filed: Sep. 30, 2013

(65) Prior Publication Data

US 2014/0031515 A1 Jan. 30, 2014

Related U.S. Application Data

(63) Continuation of application No. PCT/JP2012/058735, filed on Mar. 30, 2012.

(30) Foreign Application Priority Data

Mar. 30, 2011 (JP) .................................. 2011-075386
Mar. 30, 2011 (JP) .................................. 2011-075439

(51) Int. Cl.
| | | |
|---|---|---|
| C08G 64/00 | (2006.01) | |
| C08G 64/02 | (2006.01) | |
| C08G 64/30 | (2006.01) | |
| C08G 75/00 | (2006.01) | |

(52) U.S. Cl.
CPC .......... *C08G 64/305* (2013.01); *C08G 64/0208* (2013.01)
USPC .............................. 528/371; 528/67; 528/370

(58) Field of Classification Search
USPC ............................................ 528/67, 370, 371
See application file for complete search history.

(56) References Cited

U.S. PATENT DOCUMENTS

| | | | |
|---|---|---|---|
| 8,445,624 B2 * | 5/2013 | Fuji et al. ..................... 528/196 |
| 8,487,067 B2 | 7/2013 | Namiki et al. | |
| 2011/0034646 A1 | 2/2011 | Fuji et al. | |
| 2012/0232243 A1 | 9/2012 | Namiki et al. | |
| 2013/0296526 A1 | 11/2013 | Namiki et al. | |

FOREIGN PATENT DOCUMENTS

| | | |
|---|---|---|
| EP | 2 236 540 A1 | 10/2010 |
| JP | 2001-302783 | 10/2001 |
| JP | 2003-327683 | 11/2003 |
| JP | 2004-189858 | 7/2004 |
| JP | 2006-232897 | 9/2006 |
| JP | 2008-024919 | 2/2008 |
| JP | 2009-161745 | 7/2009 |
| JP | 2010-150540 | 7/2010 |
| JP | 2011-001455 | 1/2011 |
| WO | 2004/111106 | 12/2004 |
| WO | 2009/120235 | 10/2009 |

OTHER PUBLICATIONS

International Search Report issued Jun. 12, 2012 in PCT/JP2012/058735 filed Mar. 30, 2012.
U.S. Appl. No. 14/150,363, filed Jan. 8, 2014, Namiki et al.
U.S. Appl. No. 14/041,636, filed Sep. 30, 2013, Namiki et al.
U.S. Appl. No. 14/041,489, filed Sep. 30, 2013, Namiki et al.
U.S. Appl. No. 14/041,397, filed Sep. 30, 2013, Yokogi et al.
Office Action issued Aug. 11, 2014 in European Patent Application No. 12763109.1 filed Mar. 30, 2012.
Office Action issued Oct. 10, 2014, in Chinese Patent Application No. 201280016551.6 filed Mar. 30, 2012 w/English translation.

\* cited by examiner

*Primary Examiner* — Terressa Boykin
(74) *Attorney, Agent, or Firm* — Oblon, Spivak, McClelland, Maier & Neustadt, L.L.P.

(57) ABSTRACT

The present invention is a production method of a polycarbonate resin, including a step of performing melt polycondensation by continuously feeding a dihydroxy compound (A) having a predetermined moiety in a part of the structure and a carbonic acid diester each in a liquid state to a reactor, wherein the residence time from liquefaction of the dihydroxy compound to its feeding to a reactor is from 0.1 to 10 hours.

24 Claims, 2 Drawing Sheets

PRODUCTION METHOD OF POLYCARBONATE RESIN

TECHNICAL FIELD

The present invention relates to a production method of a polycarbonate resin for stably producing a polycarbonate resin excellent in the transparency, color hue, heat resistance, moldability, mechanical strength and the like.

BACKGROUND ART

A polycarbonate resin is generally produced using bisphenols as a monomer ingredient and by making use of its superiority such as transparency, heat resistance and mechanical strength, this resin is widely utilized as a so-called engineering plastic in the fields of electric·electronic component, automotive component, optical recording medium and optics such as lens.

The conventional polycarbonate resin is produced using a raw material derived from petroleum resources, but in recent years, depletion of petroleum resources is feared, and it is demanded to provide a polycarbonate resin using a raw material obtained from biomass resources such as plant. In addition, because of a concern that global warming due to increase or accumulation of carbon dioxide emissions may bring about climate change or the like, development of a polycarbonate resin using a plant-derived monomer as a raw material and being carbon neutral even when discarded after use is demanded. Under these circumstances, a method for obtaining a polycarbonate resin by using, as a monomer ingredient, isosorbide (hereinafter, sometimes referred to as "ISB") that is a dihydroxy compound obtained from biomass resources, and allowing transesterification with a carbonic acid diester to proceed while removing a byproduct monohydroxy compound by distillation under reduced pressure, has been proposed (see, for example, Patent Documents 1 to 3).

A dihydroxy compound having an ether bond in the molecule, such as ISB, is generally low in the thermal stability or stability to oxygen, and a transesterification reaction of performing the reaction at a high temperature has a problem that the obtained polycarbonate resin is colored or the reaction cannot achieve a desired molecular weight. To cope with such a problem, a method of reducing a thermal load in the reaction step and thereby improving a color tone of the obtained polycarbonate resin has been reported (see, for example, Patent Document 4). Also, studies are being made on the storage method for the above-described unstable compound (see Patent Document 5) or made with the aim of enhancing the quality of the obtained polycarbonate resin by appropriately treating a mixture solution of raw materials composed of a dihydroxy compound and a carbonic acid ester (see, Patent Document 6).

Furthermore, there has been proposed a method for producing a polycarbonate resin as a copolymer of an alicyclic dihydroxy compound and an aromatic dihydroxy compound which are different in the structure of the dihydroxy compound used, wherein the dihydroxy compounds are separately dissolved (see, Patent Document 7). A relatively high temperature is required for dissolving an aromatic dihydroxy compound and therefore, an alicyclic dihydroxy compound poor in the thermal stability is, when mixed and then dissolved, disadvantageously subject to thermal deterioration, but since these compounds are dissolved separately, the alicyclic dihydroxy compound can be stored at a lower temperature and in turn, the quality of the obtained polycarbonate resin is improved.

BACKGROUND ART DOCUMENT

Patent Document

Patent Document 1: International Publication No. 2004/111106
Patent Document 2: JP-A-2006-232897 (the term "JP-A" as used herein means an "unexamined published Japanese patent application")
Patent Document 3: JP-A-2008-24919
Patent Document 4: JP-A-2009-161745
Patent Document 5: International Publication No. 2009/120235
Patent Document 6: JP-A-2010-150540
Patent Document 7: JP-A-2003-327683

SUMMARY OF INVENTION

Problem that Invention is to Solve

Meanwhile, studies by the present inventors have revealed that when a dihydroxy compound for use in the present invention is stored for a long time in a molten state, this not only affects the color tone of the obtained polycarbonate resin but also affects the reactivity. In especially a continuous polymerization process useful in view of productivity and quality for producing a polycarbonate resin in industry, a change in the reactivity of the raw material makes it impossible to produce a polycarbonate resin under constant reaction conditions, giving rise to a problem such as decrease in the yield of a product or failure in stabilizing the product quality. In the conventional method, since the preparation method for a mixture solution of raw materials is in a batch system, a time is required for melting the raw material or the time from melting to use in the reaction is changed, which are considered to cause fluctuation in the reactivity.

Furthermore, studies by the present inventors have revealed that oxygen entrained between solid particles can be hardly removed completely and since even if purging with an inert gas is repeated after depressurization/degassing, it is difficult to completely remove oxygen, and therefore the dihydroxy compound for use in the present invention cannot be completely prevented from deterioration even when its melting temperature is reduced.

On the other hand, in the case of obtaining a polycarbonate resin by a transesterification method, it is important to control the terminal group concentration affecting the polymerization rate or quality to a predetermined value, and this requires precisely controlling the charge molar ratio of monomers, that is, a dihydroxy compound and a carbonic acid diester, but quantitative feed of a solid raw material is difficult; and therefore, for achieving the required charge accuracy, a solid monomer must be melted and treated as a liquid. Under these circumstances, a method where despite essentially including a step of melting the dihydroxy compound for use in the present invention, the compound can maintain its quality and be used for a polycondensation reaction, is demanded.

Means for Solving Problem

As a result of many intensive studies to solve the above-described problems, the present inventors have found that in a method for producing a polycarbonate resin by polycondensation between a dihydroxy compound having a moiety represented by formula (1) shown later and a carbonic acid diester, when the residence time from liquefaction of the dihydroxy compound to its feeding to a reactor is set to a predetermined range, a polycarbonate resin excellent in the transparency, color hue, heat resistance, thermal stability, mechanical strength and the like can be produced efficiently and stably. The present invention has been accomplished based on this finding. That is, the gist of the present invention resides in the following [1] to [24].

[1] A method for producing a polycarbonate resin, comprising a step of performing melt polycondensation by continuously feeding a dihydroxy compound (A) having a moiety represented by the following formula (1) in a part of the structure and a carbonic acid diester each in a liquid state to a reactor, wherein the residence time from liquefaction of said dihydroxy compound (A) to its feeding to the reactor is from 0.1 to 10 hours:

[Chem. 1]

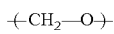  (1)

(with the proviso excluding the case where the moiety represented by formula (1) is a moiety constituting a part of —$CH_2$—OH).

[2] The method for producing a polycarbonate resin as described in the above [1], wherein said dihydroxy compound (A) and a carboxylic acid diester are continuously fed to a reactor such that the elapse time after mixing them becomes less than 5 hours, or these are continuously fed without mixing but independently to a reactor.

[3] The method for producing a polycarbonate resin as described in the above [1] or [2], wherein said dihydroxy compound (A) is a compound having a cyclic ether structure.

[4] The method for producing a polycarbonate resin as described in any one of the above [1] to [3], wherein said dihydroxy compound (A) as a solid is liquefied by feeding it to a dissolution vessel containing a liquid obtained by previously melting said dihydroxy compound (A).

[5] The method for producing a polycarbonate resin as described in any one of the above [1] to [4], wherein said aliphatic dihydroxy compound (A) is a compound represented by the following formula (2):

[Chem. 2]

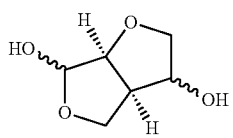  (2)

[6] The method for producing a polycarbonate resin as described in the above [4] or [5], wherein the internal temperature of said dissolution vessel is 120° C. or less and the difference between the internal temperature and the heating medium temperature is 50° C. or less.

[7] The method for producing a polycarbonate resin as described in any one of the above [2] to [6], wherein said dihydroxy compound (A) and a carbonic acid diester are continuously fed to a reactor such that the elapse tome after mixing them becomes less than 30 minutes.

[8] The method for producing a polycarbonate resin as described in any one of the above [1] to [3], wherein said dihydroxy compound (A) is a compound represented by the following formula (3) or (4):

[Chem. 3]

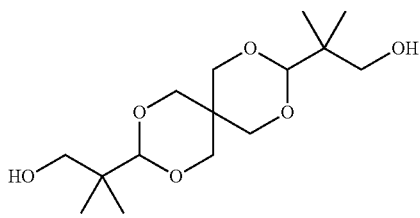  (3)

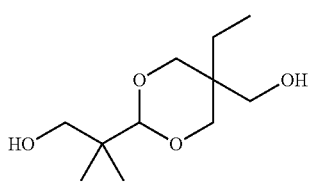  (4)

[9] The method for producing a polycarbonate resin as described in the above [8], wherein said compound represented by formula (3) or (4) as a solid is liquefied by feeding it to a dissolution vessel containing a liquid obtained by previously melting said carbonic acid diester.

[10] The method for producing a polycarbonate resin as described in the above [8] or [9], wherein the internal temperature of said dissolution vessel is 200° C. or less and the difference between the internal temperature and the heating medium temperature is 50° C. or less.

[11] The method for producing a polycarbonate resin as described in any one of the above [4] to [10], wherein said solid dihydroxy compound (A) is continuously fed to said dissolution vessel and at the same time, the liquefied dihydroxy compound (A) is continuously discharged from said dissolution vessel.

[12] The method for producing a polycarbonate resin as described in the above [11], wherein assuming that the weight of the dihydroxy compound (A) held inside said dissolution vessel is A [kg] and the discharge flow rate of said dihydroxy compound (A) is B [kg/hr], the following formula (I) is satisfied:

$$0.05 \leq A/B \leq 5 \quad (I)$$

[13] The method for producing a polycarbonate resin as described in any one of the above [4] to [12], wherein said solid dihydroxy compound (A) fed to said dissolution vessel contains, per kg, 10 or less massive materials having a maximum length of 3 cm or more.

[14] The method for producing a polycarbonate resin as described in any one of the above [4] to [13], wherein said dissolution vessel has a stirrer and a heat exchanger allowing a heating medium to flow therein.

[15] The method for producing a polycarbonate resin as described in any one of the above [4] to [14], wherein assuming that the volume of the dihydroxy compound (A) held inside said dissolution vessel is V [m³] and the contact area between said dihydroxy compound (A) and the heat exchanger is S [m²], the following formula (II) is satisfied:

$$V/S \leq 0.3 \quad (II)$$

[16] The method for producing a polycarbonate resin as described in any one of the above [4] to [15], wherein said dihydroxy compound (A) is liquefied using two or more dissolution vessels connected in series and the temperature of said heating medium of the dissolution vessel on the downstream side is not more than the temperature of the heating medium of the dissolution vessel on the upstream side.

[17] The method for producing a polycarbonate resin as described in any one of the above [4] to [16], wherein the oxygen concentration inside said dissolution vessel is 1,000 ppm by volume or less.

[18] The method for producing a polycarbonate resin as described in any one of the above [4] to [17], wherein an inert gas containing 10 ppm by volume or less of oxygen is blown into the liquid of the dihydroxy compound (A) held in said dissolution vessel.

[19] The method for producing a polycarbonate resin as described in any one of the above [4] to [18], wherein:

said dihydroxy compound (A) and a dihydroxy compound (B) other than said dihydroxy compound (A) are used as raw materials, and said dihydroxy compound (B) is liquefied in a dissolution vessel different from a dissolution vessel in which said dihydroxy compound (A) is liquefied.

[20] The method for producing a polycarbonate resin as described in the above [19], wherein when the melting point of said dihydroxy compound (B) is higher than the melting point of a carbonic acid diester, said dihydroxy compound (B) as a solid is liquefied by feeding it to a liquid obtained by previously melting the carbonic acid diester.

[21] The method for producing a polycarbonate resin as described in any one of the above [1] to [20], wherein all dihydroxy compounds and a carbonic acid diester used for the reaction are mixed by a static mixer and thereafter fed to a reactor.

[22] The method for producing a polycarbonate resin as described in any one of the above [1] to [21], wherein all dihydroxy compounds and a carbonic acid diester used for the reaction are filtered through a filter and thereafter charged into a reactor.

[23] The method for producing a polycarbonate resin as described in any one of the above [1] to [22], wherein said melt polycondensation is performed in the presence of a compound of at least one metal selected from metals belonging to Group 2 of the long-form periodic table and lithium.

[24] The method for producing a polycarbonate resin as described in any one of the above [19] to [23], which is a method for continuously polycarbonate resin by using said dihydroxy compound (A) and said dihydroxy compound (B) as raw materials and comprises a composition switching step of changing the weight fraction of at least one dihydroxy compound out of the raw material composition fed to a reactor, based on all dihydroxy compounds, to a different weight fraction, wherein:

the difference between the weight fractions before and after said composition switching step is 1 wt % or more.

Effects of Invention

According to the production method of a polycarbonate resin of the present invention, a polycarbonate resin excellent in the transparency, color hue, heat resistance, thermal stability, mechanical strength and the like can be produced efficiently and stably. In particular, according to the production method of a polycarbonate resin of the present invention, thermal deterioration of the dihydroxy compound in the raw material preparation process is suppressed, so that the reaction state in the polycondensation process can be stabilized and a polycarbonate resin with uniform quality in terms of molecular weight and color tone can be obtained.

MODE FOR CARRYING OUT INVENTION

Figure 1:
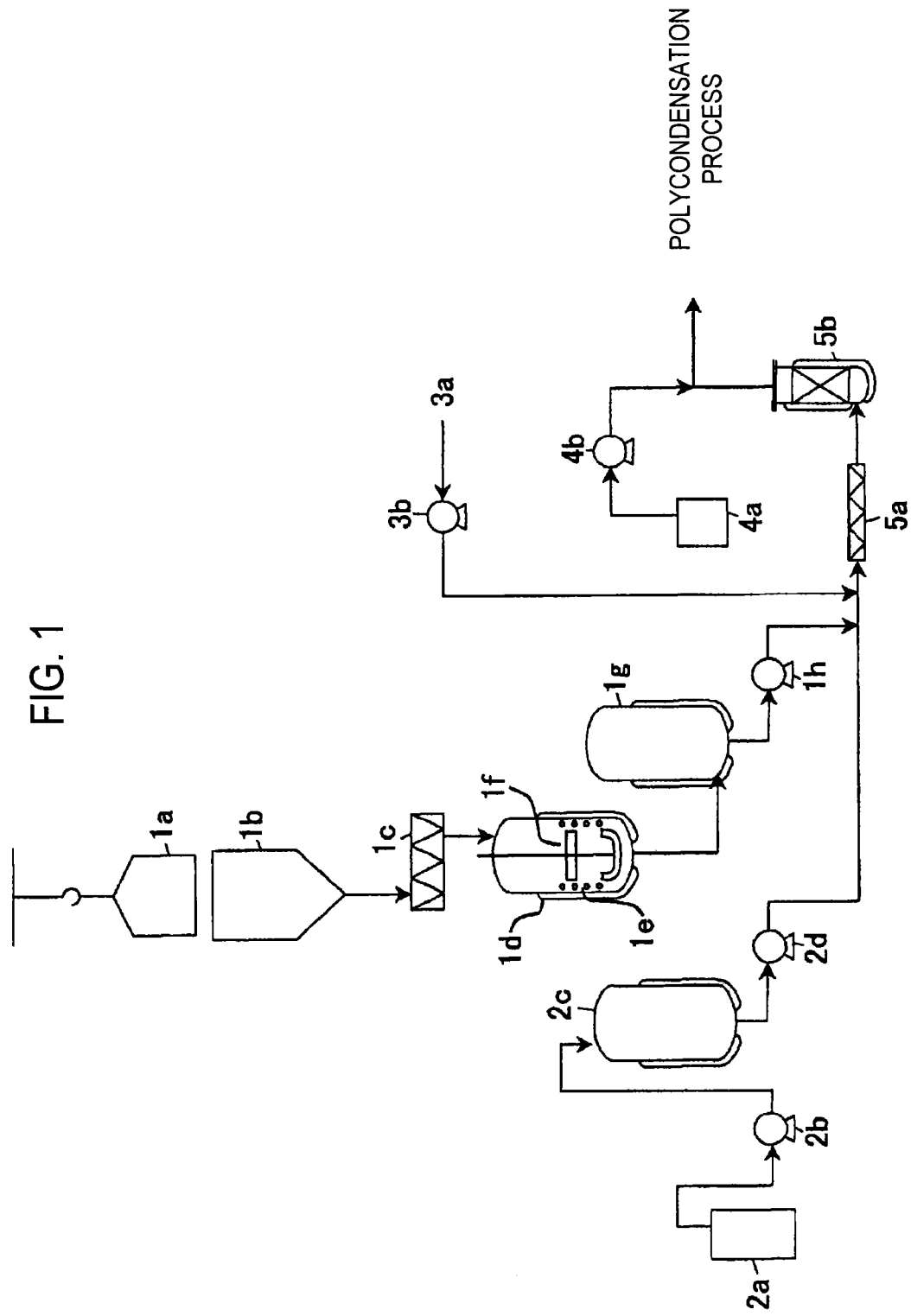
FIG. 1 is a process chart showing the raw material preparation process in the production method of the present invention.

The mode for carrying out the present invention is described in detail below, but the constituent requirements described below are an example (representative example) of the embodiment of the present invention, and the present invention is not limited to the following contents as long as its gist is observed.

Incidentally, the expression "(numerical or physical value) to (numerical or physical value)" as used in the description of the present invention is intended to include the numerical or physical values before and after "to".

The production method of a polycarbonate resin of the present invention is a method for producing a polycarbonate resin through melt polycondensation by continuously feeding a dihydroxy compound (A) having a moiety represented by the following formula (1) in a part of the structure and a carbonic acid diester each in a liquid state to a reactor, wherein the residence time from liquefaction of the dihydroxy compound to its feeding to the reactor is from 0.1 to 10 hours:

[Chem. 4]

$$-\!\!\left(\mathrm{CH_2\!-\!O}\right)\!\!- \tag{1}$$

(with the proviso excluding the case where the moiety represented by formula (1) is a moiety constituting a part of —$CH_2$—OH).

<Raw Material and Catalyst>

The raw material and catalyst, which can be used for the polycarbonate resin of the present invention, are described below.

(Dihydroxy Compound)

The dihydroxy compound (A) for use in the production of the polycarbonate resin of the present invention has a moiety represented by the following formula (1). Hereinafter, this dihydroxy compound is sometimes referred o as "dihydroxy compound (A) of the present invention".

[Chem. 5]

$$-\!\!\left(\mathrm{CH_2\!-\!O}\right)\!\!- \tag{1}$$

(with the proviso excluding the case where the moiety represented by formula (1) is a moiety constituting a part of —$CH_2$—OH).

The dihydroxy compound (A) of the present invention specifically includes, for example, oxyalkylene glycols, a compound having, in the main chain, an ether group bonded to an aromatic group, and a dihydroxy compound having a cyclic ether structure.

Examples of the oxyalkylene glycols include diethylene glycol, triethylene glycol, tetraethylene glycol, polyethylene glycol, and polypropylene glycol.

Examples of the compound having, in the main chain, an ether group bonded to an aromatic group include a compound having a fluorene skeleton, such as 9,9-bis(4-(2-hydroxyethoxy)phenyl)fluorene, 9,9-bis(4-(2-hydroxypropoxy)phenyl)fluorene, 9,9-bis(4-(2-hydroxyethoxy)-3-methylphenyl)fluorene, 9,9-bis(4-(2-hydroxypropoxy)-3-methylphenyl) fluorene, 9,9-bis(4-(2-hydroxypropoxy)-3-methylphenyl)

fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene and 9,9-bis(4-(3-hydroxy-2,2-dimethylpropoxy)phenyl)fluorene; 2,2-bis(4-(2-hydroxyethoxy)phenyl)propane, 2,2-bis(4-2-hydroxypropoxy)phenyl)propane, 1,3-bis(2-hydroxyethoxy)benzene, 4,4'-bis(2-hydroxyethoxy)biphenyl, and bis(4-(2-hydroxyethoxy)phenyl)sulfone.

Examples of the dihydroxy compound having a cyclic ether structure include a dihydroxy compound represented by the following formula (2) and a spiroglycol represented by the following formula (3) or (4).

Among these, in view of availability, handling, reactivity at the polycondensation and color hue of the obtained polycarbonate resin, a dihydroxy compound having a plurality of cyclic ether structures is preferred; a dihydroxy compound represented by the following formula (2), and a dihydroxy compound having two cyclic ether structures, such as spiroglycol represented by the following formula (3), are more preferred; and an anhydrous sugar alcohol that is a sugar-derived dihydroxy compound having two cyclic ether structures, such as dihydroxy compound represented by the following formula (2), is still more preferred.

Among these dihydroxy compounds, it is preferred in view of light resistance of the polycarbonate resin to use a dihydroxy compound having no aromatic ring structure, and above all, an anhydrous sugar alcohol represented by the following formula (2) obtained through dehydration condensation of sorbitol that is produced from various starches existing abundantly as a plant-derived resource and being easily available, is most preferred from the aspects of availability, ease of production, light resistance, optical characteristics, moldability, heat resistance and carbon neutrality.

One of these dihydroxy compounds may be used alone, or two or more thereof may be used in combination, according to the performance required of the polycarbonate obtained.

Incidentally, the "cyclic ether structure" in the "dihydroxy compound having a cyclic ether structure" means a structure having an ether group in a cyclic structure, where the carbon constituting the cyclic chain is an aliphatic carbon.

[Chem. 6]

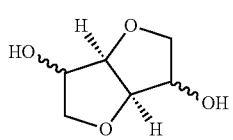

(2)

[Chem. 7]

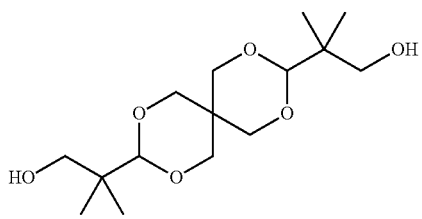

(3)

[Chem. 8]

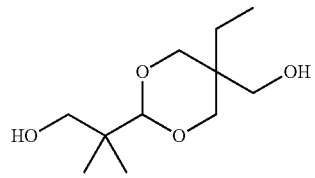

(4)

The dihydroxy compound represented by formula (2) includes isosorbide (ISB), isomannide and isoidide, which are in a stereoisomeric relationship. One of these compounds may be used alone, or two or more thereof may be used in combination.

The polycarbonate resin of the present invention may contain a constituent unit derived from a dihydroxy compound (B) other than the dihydroxy compound (A) of the present invention. The dihydroxy compound (B) includes, for example, a dihydroxy compound of a linear aliphatic hydrocarbon, a dihydroxy compound of an alkyl branched aliphatic hydrocarbon, a dihydroxy compound of an alicyclic hydrocarbon, and aromatic bisphenols.

Examples of the dihydroxy compound of a linear aliphatic hydrocarbon include ethylene glycol, 1,3-propanediol, 1,2-propanediol, 1,4-butanediol, 1,3-butanediol, 1,2-butanediol, 1,5-heptanediol, 1,6-hexanediol, 1,10-decanediol, and 1,12-dodecanediol.

Examples of the dihydroxy compounds of a linear branched aliphatic hydrocarbon include neopentyl glycol and hexylene glycol.

Examples of the dihydroxy compound of an alicyclic hydrocarbon include 1,2-cyclohexanediol, 1,2-cyclohexanedimethanol, 1,3-cyclohexanedimethanol, 1,4-cyclohexanedimethanol, tricyclodecanedimethanol, pentacyclopentadecanedimethanol, 2,6-decalindimethanol, 1,5-decalindimethanol, 2,3-decalindimethanol, 2,3-norbornanedimethanol, 2,5-norbornanedimethanol, 1,3-adamantanedimethanol, and a dihydroxy compound derived from a terpene compound, such as limonene.

Examples of the aromatic bisphenols include 2,2-bis(4-hydroxyphenyl)propane, 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxy-diphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenyl sulfone, bis(4-hydroxyphenyl)sulfide, 4,4'-dihydroxydiphenyl ether, 4,4'-dihydroxy-3,3'-dichlorodiphenyl ether, 9,9-bis(4-(2-hydroxyethoxy-2-methyl)phenyl)fluorene, 9,9-bis(4-hydroxyphenyl)fluorene, and 9,9-bis(4-hydroxy-2-methylphenyl)fluorene.

One of these compounds may be used alone, or two or more thereof may be used in combination, according to the performance required of the obtained polycarbonate resin. Among them, in view of light resistance of the polycarbonate resin, a dihydroxy compound of an aliphatic hydrocarbon and a dihydroxy compound of an alicyclic hydrocarbon, which are a dihydroxy compound having no aromatic ring structure in the molecular structure, are preferred, and these may be used in combination.

The dihydroxy compound of an aliphatic hydrocarbon is in particular preferably a dihydroxy compound of a linear aliphatic hydrocarbon having a carbon number of 3 to 6 and having a hydroxyl group at both terminals, such as 1,3-propanediol, 1,4-butanediol, 1,5-pentanediol and 1,6-hexanediol; and the dihydroxy compound of an alicyclic hydrocarbon is in particular preferably 1,2-cyclohexanedimethanol, 1,3-cyclohexanedimethanol, 1,4-cyclohexanedimethanol, or tricyclodecanedimethanol, more preferably a dihydroxy compound having a cyclohexane structure, such as 1,2-cyclohexanedimethanol, 1,3-cyclohexanedimethanol and 1,4-cyclohexanedimethanol, and most preferably 1,4-cyclohexanedimethanol.

By using the other dihydroxy compound (B), an effect of, for example, improving the flexibility of the polycarbonate resin, enhancing the heat resistance or improving the moldability can be obtained, but if the proportion of the contained constituent unit derived from the other dihydroxy compound (B) is too large, this may lead to reduction in the mechanical properties or reduction in the heat resistance. Therefore, the proportion of the constituent unit derived from the dihydroxy compound (A) having a moiety represented by formula (1) based on the molar number of constituent units derived from all dihydroxy compounds is preferably 10 mol % or more, more preferably 20 mol % or more, still more preferably 30 mol % or more, and is preferably 90 mol % or less, more preferably 85 mol % or less, still more preferably 80 mol % or less.

The dihydroxy compound (A) of the present invention may contain a stabilizer such as reducing agent, antioxidant, oxygen scavenger, light stabilizer, antacid, pH stabilizer and heat stabilizer, and in particular, since the dihydroxy compound of the present invention is susceptible to property change under acidic conditions, it is preferred to contain a basic stabilizer. The basic stabilizer includes hydroxide, carbonate, phosphate, phosphite, hypophosphite, borate and fatty acid salt of a metal belonging to Group 1 or 2 of the long-form periodic table (Nomenclature of Inorganic Chemistry IUPAC Recommendations 2005); a basic ammonium compound such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide and butyltriphenylammonium hydroxide; an amine-based compound such as diethylamine, dibutylamine, triethylamine, morpholine, N-methylmorpholine, pyrrolidine, piperidine, 3-amino-1-propanol, ethylenediamine, N-methyldiethanolamine, diethylethanolamine, 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline; and a hindered amine-based compound such as di-(tert-butyl)amine and 2,2,6,6-tetramethylpiperidine. Among these stabilizers, tetramethylammonium hydroxide, morpholine, imidazole and a hindered amine-based compound are preferred.

The content of the basic stabilizer in the dihydroxy compound (A) of the present invention is not particularly limited, but since the dihydroxy compound (A) of the present invention is unstable in an acidic state, the stabilizer is preferably added such that an aqueous solution of the dihydroxy compound (A) containing the stabilizer has a pH of 7 or more. If the amount added is too small, the effect of preventing a property change of the dihydroxy compound (A) of the present invention may not be obtained, whereas if the amount added is too large, this may lead to degradation of the dihydroxy compound (A) of the present invention. Therefore, the content of the basic stabilizer is usually from 0.0001 to 1 wt %, preferably from 0.001 to 0.1 wt %, based on the dihydroxy compound (A) of the present invention.

When the dihydroxy compound (A) of the present invention containing such a basic stabilizer is used as a raw material for the production of a polycarbonate resin, the basic stabilizer itself acts as a polycondensation catalyst, not only making it difficult to control the polycondensation rate or quality but also leading to worsening of the color hue of the resin, and therefore, the basic stabilizer is preferably removed by means of ion-exchange resin, distillation or the like before using the compound as a raw material for the production of a polycarbonate resin, but when the amount of an amine-based stabilizer contained is, as the nitrogen element amount, 10 ppm by volume or less based on the dihydroxy compound of the present invention, the stabilizer does not affect the polycondensation reactivity or product quality, so that the compound can be used for the reaction without applying a purification operation such as distillation. When the distillation operation can be omitted, the number of steps where the compound is dealt with in a molten state can be reduced, and this creates an expectation that the quality of the obtained polycarbonate resin can be enhanced.

The dihydroxy compound (A) of the present invention is likely to be gradually oxidized by oxygen and therefore, it is important to prevent oxygen-induced decomposition by keeping away from migration of water during storage or production, using an oxygen scavenger, or creating a nitrogen atmosphere. Isosorbide when oxidized generates a decomposition product including formic acid. For example, when a polycarbonate resin is produced using isosorbide containing such a decomposition product, this may disadvantageously not only cause coloration of the obtained polycarbonate resin or significant deterioration of the physical properties but also affect the polycondensation reaction, giving rise to failure in obtaining a polycondensate having a high molecular weight.

(Carbonic Acid Diester)

The polycarbonate resin of the present invention can be obtained by a polycondensation reaction using a dihydroxy compound containing the above-described dihydroxy compound (A) of the present invention and a carbonic acid diester as raw materials.

The carbonic acid diester used includes usually a compound represented by the following formula (5). One of these carbonic acid diesters may be used alone, or two or more thereof may be mixed and used.

[Chem. 9]

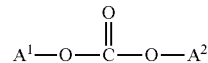

(5)

(in formula (5), each of $A^1$ and $A^2$ is a substituted or unsubstituted aliphatic hydrocarbon group having a carbon number of 1 to 18 or a substituted or unsubstituted aromatic hydrocarbon group, and $A^1$ and $A^2$ may be the same or different).

Each of $A^1$ and $A^2$ is preferably a substituted or unsubstituted aromatic hydrocarbon group, more preferably an unsubstituted aromatic hydrocarbon group. Incidentally, the substituent on the aliphatic hydrocarbon group includes an ester group, an ether group, a carboxylic acid, an amide group, and a halogen atom, and the substituent on the aromatic hydrocarbon group includes an alkyl group such as methyl group and ethyl group.

Examples of the carbonic acid diester represented by formula (5) include diphenyl carbonate (hereinafter, sometimes referred to as "DPC"), a substituted diphenyl carbonate such as ditolyl carbonate, dimethyl carbonate, diethyl carbonate, and di-t-butyl carbonate. Among these, diphenyl carbonate and a substituted diphenyl carbonate are preferred, and diphenyl carbonate is more preferred. Incidentally, the carbonic acid diester sometimes contains an impurity such as chloride ion, and the impurity may inhibit the polycondensation reaction or impair the color hue of the obtained polycarbonate resin. Therefore, it is preferred to use a compound that has been purified by distillation or the like as needed.

The dihydroxy compound and carbonic acid diester as raw materials may be independently charged to a reactor to undergo a transesterification reaction but may be also uniformly mixed before a transesterification reaction. The temperature at the mixing is suitably 80° C. or more, preferably 90° C. or more, and the upper limit thereof is suitably 250° C. or less, preferably 200° C. or less, more preferably 150° C. or less. Above all, a temperature of 100 to 130° C. is suitable. If the mixing temperature is too low, the dissolution rate may be low, or the degree of solubility may be insufficient, often leading to a trouble such as solidification, whereas if the mixing temperature is too high, thermal deterioration of the dihydroxy compound may be brought about, as a result, the color hue of the obtained polycarbonate resin may be worsened.

In the present invention, the carbonic acid ester is suitably used in a molar ratio of 0.90 to 1.20, preferably from 0.95 to 1.10, more preferably from 0.97 to 1.03, still more preferably from 0.99 to 1.02, based on all dihydroxy compounds used for the reaction including the dihydroxy compound of the present invention. If this molar ratio is small, the terminal hydroxyl group of the polycarbonate resin produced may be increased to worsen the thermal stability of the polymer or bring about coloration during molding, reduction in the transesterification reaction rate, or failure in obtaining a desired high molecular weight product. On the other hand, if the molar ratio is large, the transesterification reaction rate may be reduced or production of a polycarbonate having a desired molecular weight may become difficult. Reduction in the transesterification reaction rate may lead to increase in the heat history at the polymerization reaction, as a result, the color hue of the obtained polycarbonate resin may be worsened.

Furthermore, when the molar ratio of the carbonic acid diester based on all dihydroxy compounds including the dihydroxy compound (A) of the present invention is increased, the amount of the residual carbonic acid diester in the obtained polycarbonate resin may be increased and this residual carbonic diester may become a gas during molding to disadvantageously cause a molding failure or bleed out from the product. The concentration of the carbonic acid diester remaining in the polycarbonate resin pellet or film obtained by the method of the present invention is preferably 200 ppm by weight or less, more preferably 100 ppm by weight or less, still more preferably 60 ppm by weight or less, yet still more preferably 30 ppm by weight or less.

(Polycondensation Reaction Catalyst)

The polycarbonate resin of the present invention is produced, as described above, by causing a polycondensation reaction between a dihydroxy compound containing the dihydroxy compound (A) of the present invention and a carbonic acid diester represented by formula (5). More specifically, the polycarbonate resin is obtained by causing a polycondensation reaction and removing a byproduct monohydroxy compound and the like from the system. In this case, the polycondensation reaction is usually performed in the presence of a polycondensation reaction catalyst.

The polycondensation reaction catalyst (hereinafter, sometimes simply referred to as catalyst or polycondensation catalyst) which can be used at the production of the polycarbonate resin of the present invention can exert a significantly great effect on the reaction rate or color tone of the polycarbonate resin.

The catalyst used is not particularly limited as long as the transparency, color hue, heat resistance, thermal stability and mechanical strength of the polycarbonate resin produced can be satisfied, but the catalyst includes a compound of a metal belonging to Group 1 or 2 of the long-form periodic table (hereinafter, simply referred to as "Group 1" or "Group 2"), and a basic compound such as basic boron compound, basic phosphorus compound, basic ammonium compound and amine-based compound. Preferably, at least either one of a Group 1 metal compound and a Group 2 metal compound is used. Of these, a compound of at least one metal selected from the group consisting of Group 2 metals and lithium is more preferred.

Together with at least either one of a Group 1 metal compound and a Group 2 metal compound, a basic compound such as basic boron compound, basic phosphorus compound, basic ammonium compound and amine-based compound may be secondarily used in combination, but it is particularly preferred to use only at least either one of a Group 1 metal compound and a Group 2 metal compound. Among others, a compound of at least one metal selected from the group consisting of Group 2 metals and lithium is preferred.

As for the form of the Group 1 metal compound and Group 2 metal compound, the compound is usually used in the form of a hydroxide or a salt such as carbonate, carboxylate and phenoxide, but a hydroxide, a carbonate and an acetate are preferred in view of ease of availability and handling, and an acetate is preferred in view of color hue and polycondensation activity.

Examples of the Group 1 metal compound include sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium boron hydride, potassium boron hydride, lithium boron hydride, cesium boron hydride, sodium boron phenylate, potassium boron phenylate, lithium boron phenylate, cesium boron phenylate, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, alcoholates and phenolates of sodium, potassium, lithium and cesium, and disodium, dipotassium, dilithium and dicesium salts of bisphenol A. Among these, a lithium compound is preferred.

Examples of the Group 2 metal compound include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Among these, a magnesium compound, a calcium compound and a barium compound are preferred, a magnesium compound and/or a calcium compound are more preferred in view of the polycondensation activity and color hue of the obtained polycarbonate resin, and a calcium compound is most preferred.

Examples of the basic boron compound include sodium, potassium, lithium, calcium, barium, magnesium and strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron and butyltriphenylboron.

Examples of the basic phosphorus compound include triethylphosphine, tri-n-propylphosphine, triisopropylphosphine, tri-n-butylphosphine, triphenylphosphine, tributylphosphine, and a quaternary phosphonium salt.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine-based compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, aminoquinoline, and guanidine.

The amount of the polycondensation catalyst used is usually from 0.1 to 300 µmol, preferably from 0.5 to 100 µmol, per mol of all dihydroxy compounds used for the polycondensation. Above all, in the case of using a compound of at least one metal selected from lithium and metals belonging to Group 2 of the long-form periodic table, particularly, in the case of using a magnesium compound and/or a calcium compound, the amount of the catalyst is usually 0.1 µmol or more, preferably 0.3 µmol or more, more preferably 0.5 µmol or more, per mol of all dihydroxy compounds. The upper limit thereof is usually 20 µmol, preferably 10 µmol, more preferably 3 µmol, still more preferably 1.5 µmol.

If the amount of the catalyst is too small, the polycondensation rate is slowed down and in order to obtain a polycarbonate resin having a desired molecular weight, the polycondensation temperature must be raised, leaving the possibility that the color hue of the obtained polycarbonate resin may be worsened or an unreacted raw material may volatilize during the polycondensation to change the molar ratio between the dihydroxy compound and the carbonic acid diester and cause a failure in reaching a desired molecular weight. On the other hand, if the amount of the polycondensation catalyst used is too large, an undesirable side reaction may occur and this may cause worsening of color hue of the obtained polycarbonate resin or coloring of the resin during mold processing.

Also, when a Group 1 metal, among others, sodium, potassium or cesium, is contained in a large amount in the polycarbonate resin, the metal may adversely affect the color hue and since such a metal may migrate not only from the catalyst used but also from the raw material or reaction apparatus, the total amount of these compounds in the polycarbonate resin is, as the metal amount, usually 2 µmol or less, preferably 1 µmol or less, more preferably 0.5 µmol or less, per mol of all dihydroxy compounds.

<Raw Material Preparation Process>

In the reaction by melt polycondensation, the molar ratio between the dihydroxy compound and the carbonic acid diester must be strictly controlled so as to keep the reaction rate or polycarbonate resin quality constant. The required quantitative precision can be hardly achieved by the method of feeding a solid and therefore, the dihydroxy compound and carbonic acid diester used as raw materials of the polycarbonate resin are usually treated as a molten mixture by using a batch, semi-batch or continuous stirring vessel-type apparatus in an atmosphere of an inert gas such as nitrogen and argon.

Among usually known dihydroxy compounds, the dihydroxy compound (A) of the present invention is particularly susceptible to the effect of heat or oxygen and is likely to deteriorate during handling in the molten state in the raw material preparation process, leading to reduction in the reaction rate or coloration of the obtained polycarbonate resin. Furthermore, the dihydroxy compound (A) of the present invention is usually in a solid state at room temperature and at the time of feeding it to a dissolution vessel, air may be entrained between solids. Reducing the oxygen concentration in the dissolution vessel to zero is substantially impossible and for minimizing the deterioration by oxygen, it is important to allow the compound to spend a minimum time until feeding to a reactor. Also, the temperature at which the dihydroxy compound is liquefied is preferably kept low. Since deterioration proceeds even at a temperature minimally necessary to keep the molten state, it is important to, while keeping the temperature at the melting to a minimum, minimize the time from liquefaction of the dihydroxy compound (A) of the present invention to its feeding to a reactor or minimize the elapse time between mixing of the dihydroxy compound (A) of the present invention with a carbonic acid ester and feeding of the mixture to a reactor.

In the present invention, in any case, the residence time from liquefaction of the dihydroxy compound (A) of the present invention to its feeding to a reactor is within 10 hours, preferably within 8 hours, more preferably within 6 hours, still more preferably within 4.5 hours. On the other hand, when it is intended to liquefy the dihydroxy compound in a short time, the compound must be heated to a high temperature and this rather causes deterioration of the raw material. Also, unless the raw material melted in a dissolution vessel is reserved in a certain amount, when a some trouble is generated to stop the raw material feeding, the reaction step must be also stopped, and the raw material is greatly lost so as to again start the reaction. Accordingly, the lower limit of the residence time is 0.1 hours or more, preferably 0.3 hours or more, more preferably 0.5 hours or more.

Incidentally, the reactor as used in the present invention is defined as a vessel where the amount of a monohydroxy compound (in the case of using diphenyl carbonate as the carbonic acid ester, phenol) produced by the polycondensation reaction is 5% or more of the theoretical production amount.

Furthermore, the reactivity of the dihydroxy compound (A) of the present invention is reduced due to thermal deterioration and as long as the compound is stored in the molten state, it is difficult to completely inhibit the deterioration. However, when the degree of deterioration can be restrained from changing, the later polycondensation process can be stabilized. For this reason, the residence time from liquefaction to feeding to a reactor is preferably constant. As described later, the feed rate of the raw material to the dissolution vessel and the discharge rate of the raw material from the dissolution vessel are made equal, whereby the liquid amount (kg) of the content fluid becomes constant, and in addition, the discharge rate (kg/hr) of the raw material from the dissolution vessel is made constant, so that a constant residence time can be kept. Here, the residence time of the dihydroxy compound of the present invention relevant to the feed rate of the raw material is preferably adjusted to fall in the range of ±20%, more preferably within ±10%, of the preset time. Furthermore, the liquefaction temperature is also preferably adjusted to fall in the range of ±10° C., more preferably within ±5° C., of the preset temperature.

On the other hand, the production of a polycarbonate resin by melt polycondensation generally employs a method where a dihydroxy compound and a carbonic acid diester used for the reaction are previously mixed to give a predetermined molar ratio and the mixture solution of raw materials is stored in the molten state. However, the dihydroxy compound (A) of the present invention is highly hydrophilic and therefore, when mixed with a carbonic acid diester or a low-polarity dihydroxy compound, the solution undergoes phase separation. For example, isosorbide has a melting point of about 60° C. but when mixed with diphenyl carbonate, a phase separation temperature appears at about 120° C. Also, when spiroglycol is mixed with diphenyl carbonate at a temperature lower than the melting point of spiroglycol, a phase separation temperature appears at about 170° C. When such a condition is created, the temperature must be raised to a temperature not lower than the phase separation temperature so as to make a uniform solution, and an excessive heat load is applied. When the molten mixture of raw materials is in the phase-separated state, a liquid with a non-uniform composition may be sent when feeding the raw material to a reactor and the reaction may fail in proceeding until a desired molecular weight is reached.

From these standpoints, in the present invention, the dihydroxy compound (A) of the present invention and the carbonic acid diester are preferably fed separately to a reactor or preferably mixed immediately before a reactor and fed to the reactor. By individually feeding these materials to a reactor by means of a metering pump, a vessel for mixing the raw materials need not be provided, and an extra residence time can be reduced. Furthermore, charging a non-uniform solution into a reactor due to phase separation of the mixed solution does not occur, so that an optimal melting temperature can be set for each ingredient.

When a plurality of pipes are connected to the reactor, the pressure of the reactor becomes hard to control and therefore, it is particularly preferred to mix all raw materials in a pipe before feeding to a reactor. As described above, in the case where the mixture solution of raw materials is likely to undergo phase separation, the raw materials are preferably mixed by using a static mixer to uniformly disperse the solution.

Also, irrespective of the method for feeding the raw material to a reactor, the dihydroxy compound (A) of the present invention and a carbonic acid diester are preferably fed continuously to a reactor such that the elapse time from mixing to feeding to a reactor becomes usually less than 5 hours, preferably less than 2 hours, more preferably less than 30 minutes, or are preferably fed individually to a reactor without mixing these. If the elapse time is too long, the color tone of the obtained polycarbonate resin tends to be poor. Also, in the case where the dihydroxy compound (A) of the present invention is a spiroglycol, when a mixed raw material solution obtained by mixing the spiroglycol with the diphenyl carbonate at a temperature lower than the melting point is held as-is in the solution form for a long time, a ring-opening reaction of the spiroglycol itself may occur to cause a problem that the obtained resin is gelled by crosslinking.

In the case where the dihydroxy compound of the present invention is a compound represented by formula (2), the elapse time above is preferably 20 minutes or less, more preferably 10 minutes or less, still more preferably 5 minutes or less.

The method for liquefying (solving or melting) the dihydroxy compound (A) of the present invention includes a method of adding all at once to a dissolution vessel and melting them, and a method of previously melting the dihydroxy compound (A) of the present invention and liquefying the dihydroxy compound (A) as a solid of the present invention by feeding it to a dissolution vessel containing the molten solution obtained above.

Of these, when the latter method is employed, the time for liquefaction can be minimized. Therefore, a method of previously melting the dihydroxy compound (A) of the present invention and while continuously feeding the dihydroxy compound (A) as a solid of the present invention to a dissolution vessel containing the molten solution obtained above, continuously discharging the liquefied dihydroxy compound from the dissolution vessel is employed, whereby the time for liquefaction can be minimized and at the same time, the molten dihydroxy compound can be continuously discharged at a constant rate.

In the case where the dihydroxy compound (A) of the present invention is a spiroglycol, since the spiroglycol has a relatively high melting point, the dissolution temperature or melting/holding temperature can be lowered by mixing the compound with a carbonic acid diester having a lower melting point rather than by melting the compound alone. Accordingly, a method of continuously feeding a solid dihydroxy compound and a carbonic acid diester at constant flow rates to a dissolution vessel and at the same time, continuously discharging the mixed solution from the dissolution vessel is employed, whereby the heat history applied during liquefaction and holding of the molten state can be minimized and at the same time, the residence time required for dissolution can be made constant. Thermal deterioration of the raw material cannot be completely avoided but by keeping the residence time constant, a raw material having a constant quality can be fed to a reactor, leading to stable operation in the polycondensation process or stable quality of the polycarbonate resin.

The residence time of the present invention is described below.

First, in the present invention, an apparatus where between liquefaction of a dihydroxy compound and its feeding to a reactor, a solution containing the dihydroxy compound passes is differentiated from a dissolution vessel and a transfer pipe (including a static mixer and a filter). Then, (1) the time required for all stages in the dissolution vessel, that is, a stage of liquefying (solving or melting) a dihydroxy compound, a stage of mixing the dihydroxy compound with a carbonic acid diester, and a stage of storing the molten mixture of raw materials, and (2) the time required for all stages of transferring in the transfer pipe and passing through a static mixer or filter, are summed, and the obtained time is the actual residence time. However, the time required for all stages of transferring in the transfer pipe is as small as negligible as compared with the time required for all stages in the dissolution vessel and therefore, in the present invention, the total of the times required in all stages in the dissolution vessel is defined as the residence time T.

In the present invention, the residence time T can be referred to as the sum total of the residence times $T^i$ in the dissolution vessel i. Here, the residence time $T^i$ in the dissolution vessel i can be, as described in detail later, broken down into a combination of residence times $T_x$ of four kinds of elements (states) classified by the inflow of a substance into the dissolution vessel i and the outflow of a substance from the dissolution vessel i. Therefore, the residence time $T^i$ in the dissolution vessel i is expressed by the total of residence times of the following elements according to the dihydroxy compound liquefying method. Incidentally, in the present invention, since the transesterification reaction is performed in a continuous system and the flow rate of feeding to a reactor is constant, the flow rate of the mixed solution discharged from a dissolution vessel at least in the final stage is constant.

(Element 1)
State where outflow of a substance from a dissolution vessel is not caused:

This case indicates no outflow of a substance from a dissolution vessel i, and whether the substance is left standing still or stirred in the dissolution vessel i is no object. The residence time $T^i_1$ [hr] as the element 1 of the dissolution vessel i is the time $t^i$ [hr] for which a substance is held in the dissolution vessel i.

$$T^i_1 = t^i \quad (10)$$

$T^i_1$: the residence time [hr] as the element 1 of the dissolution vessel i, and $t^i$: the time [hr] for which a substance is held in the dissolution vessel i.

For example, the time required for heating/stirring a solid in the dissolution vessel, the time taken for mixing a dihydroxy compound and a carbonic acid diester in a batch system, and the time taken for storing the molten mixture of raw materials come under the element 1. Incidentally, the time taken for discharging a solution from a dissolution vessel is classified into the below-described element 2.

(Element 2)
State where inflow of a substance into a dissolution vessel is not caused and the flow rate at the outflow of a substance from the dissolution vessel is constant:

The residence time $T^i_2$ [hr] as the element 2 of the dissolution vessel i is determined as follows from the total amount $W^i$ [kg] of a substance present inside a dissolution vessel i and the flow rate $F^i$ [kg/hr] at the outflow of the substance from the dissolution vessel i.

$$T^i_2 = W^i/F^i \quad (11)$$

$T^i_2$: the residence time [hr] as the element 2 of the dissolution vessel i, $W^i$: the amount [kg] of a substance present inside the dissolution vessel i, and $F^i$: the flow rate [kg/hr] of the substance discharged from the dissolution vessel i.

For example, the residence time in the discharge from a batch-type dissolution vessel comes under the element 2.

(Element 3)
State where the flow rate at the inflow of a substance into a dissolution vessel and the flow rate at the outflow of a substance from the dissolution vessel are constant and equal:

Since the amount $W^i$ [kg] of a substance present inside of a dissolution vessel i is constant, the residence time $T^i_3$ [hr] as the element 3 is determined as follows from $W^i$ and the flow rate $F^i$ [kg/hr] at the outflow of the substance from the dissolution vessel i.

$$T^i_3 = W^i/F^i \quad (12)$$

$T^i_3$: the residence time [hr] as the element 3 of the dissolution vessel i, $W^i$: the amount [kg] of a substance present inside the dissolution vessel i, and $F^i$: the flow rate [kg/hr] of the substance discharged from the dissolution vessel i.

For example, the time taken for mixing a dihydroxy compound and a carbonic acid diester in a continuous system comes under the element 3.

(Element 4)
State where the flow rate at the inflow of a substance into a dissolution vessel and the flow rate at the outflow of a substance from the dissolution vessel are not constant or the flow rate at the inflow of a substance and the flow rate at the outflow of substance are not balanced:

In this case, since the change in the amount $W^i$ [kg] of a substance present inside of a dissolution vessel i is not uniform, a difference is produced in the residence time when discharging the substance. Therefore, the residence time $T^i_4$ [hr] as the element 4 of the dissolution vessel i is defined as the maximum residence time $T^i_{max}$ [hr] of a substance in a dissolution vessel i.

$$T^i_4 = T^i_{max} \quad (13)$$

$T^i_4$: the residence time [hr] as the element 4 of the dissolution vessel i, and $T^i_{max}$: the maximum residence time [hr] of a substance present inside the dissolution vessel i.

For example, the residence time in a batch-type dissolution apparatus or an intermittent mixing apparatus comes under the element 4.

In the present invention, the method for liquefying a dihydroxy compound and feeding it to a reactor includes the following method, but the present invention is not limited to this method and any method may be used.

(Method 1)
A method where a solid dihydroxy compound is dissolved in a molten carbonic acid diester and thereby liquefied.

(Method 2)
A method where to a molten mixture of a part of a predetermined amount of a dihydroxy compound and a carbonic acid diester, the remaining of the predetermined amount of a dihydroxy compound is added and dissolved.

(Method 3)
A method where a liquid dihydroxy compound and a liquid carbonic acid diester are mixed in a dissolution vessel. This method includes a step of effecting the liquefaction by heating/melting a solid dihydroxy compound alone.

(Method 4)
A method where a mixture of a solid dihydroxy compound and a solid carbonic acid diester is heated/melted and thereby liquefied.

Incidentally, in the case where a first dissolution vessel contains an undissolved solid dihydroxy compound, after transferring the discharged liquid of the first dissolution vessel to a second dissolution vessel, the dihydroxy compound may be completely dissolved in the second dissolution vessel.

In the following, referring to a representative example of the process of liquefying a dihydroxy compound and feeding it to a reactor in the present invention, the calculation formula of the residence time T based on the definitions above is described.

Representative Example 1

In the case where a liquid carbonic acid diester and a solid dihydroxy compound are continuously charged and mixed in a first dissolution vessel and the mixed solution is continuously transferred to a second dissolution vessel, completely dissolved in the second dissolution vessel and then continuously discharged:

In this example, the time from the point at which the dihydroxy compound is charged into the first dissolution vessel to the point at which a molten mixture of the liquefied dihydroxy compound and carbonic acid diester is discharged from the second dissolution vessel is taken as the residence time T in dissolution vessel. As described above, the effect of a pipe connecting dissolution vessels to each other or connecting a dissolution vessel and a reactor is not taken into account.

$$T=T^1+T^2 \quad (14)$$

T: the residence time [hr] of the dihydroxy compound from the point at which the raw material is charged into the first dissolution vessel to the point at which the molten mixture is discharged from the second dissolution vessel, $T^1$: the residence time [hr] of the dihydroxy compound in the first dissolution vessel, and $T^2$: the residence time [hr] of the dihydroxy compound in the second dissolution vessel.

Here, both the first dissolution vessel and the second dissolution vessel are in a continuous system and since the amount of a substance present in each dissolution vessel is constant and at the same time, the flow rate of a substance discharged from each dissolution vessel is constant, the element 3 above is applied to both the first dissolution vessel and the second dissolution vessel.

$$T=T^1_3+T^2_3 \quad (14)$$

$$T^1_3=W^1/F^1 \quad (15)$$

$T^1_3$: the residence time [hr] of the dihydroxy compound in the first dissolution vessel, $W^1$: the amount [kg] of a substance present inside the first dissolution vessel, and $F^1$: the flow rate [kg/hr] of the substance discharged from the first dissolution vessel.

$$T^2_3=W^2/F^2 \quad (16)$$

$T^2_3$: the residence time [hr] of the dihydroxy compound in the second dissolution vessel, $W^2$: the amount [kg] of a substance present inside the second dissolution vessel, and $F^2$: the flow rate [kg/hr] of the substance discharged from the second dissolution vessel.

Accordingly, formula (14) is rewritten as follows:

$$T=T^1_3+T^2_3=W^1/F^1+W^2/F^2 \quad (17)$$

Representative Example 2

In the case where a mixed solution of a dihydroxy compound and a carbonic acid diester is prepared in a first dissolution vessel and the mixed solution is once fed to a second dissolution vessel and completely dissolved:

Also in this example, the time from the point at which the dihydroxy compound is charged into the first dissolution vessel to the point at which the mixed solution of the liquefied dihydroxy compound and carbonic acid diester is discharged from the second dissolution vessel is taken as the residence time T in dissolution vessel. As described above, the effect of a pipe connecting dissolution vessels to each other or connecting a dissolution vessel and a reactor is not taken into account.

$$T=T^1+T^2 \quad (18)$$

T: the residence time [hr] of the dihydroxy compound from the point at which the dihydroxy compound is charged into the first dissolution vessel to the point at which the mixed solution of liquefied dihydroxy compound and carbonic acid diester is discharged from the second dissolution vessel, $T^1$: the residence time [hr] of the dihydroxy compound in the first dissolution vessel, and $T^2$: the residence time [hr] of the dihydroxy compound in the second dissolution vessel.

In this example, the first dissolution vessel corresponds to a batch system and the residence time $T^1$ in the first dissolution vessel is a residence time from the point at which heating is started to the point at which discharge is started (the time required for stirring), where the residence time above comes under the element 1 and is denoted by $T^1_1$ and the residence time in the discharge stage comes under the element 2 and is denoted by $T^1_2$. The residence time of the dihydroxy compound in the first dissolution vessel is expressed by the following formula:

$$T^1=T^1_1+T^1_2=t^1+W^1/F^1 \quad (19)$$

$T^1$: the residence time [hr] of the dihydroxy compound-containing solution in the first dissolution vessel, $T^1_1$: the time [hr] required for stirring of the dihydroxy compound-containing solution in the first dissolution vessel, $T^1_2$: the time [hr] required for discharge of the dihydroxy compound-containing solution in the first dissolution vessel, $t^1$: the time [hr] required for stirring in the first dissolution vessel, $W^1$: the amount [kg] of a substance present inside the first dissolution vessel, and $F^1$: the flow rate [kg/hr] of the substance discharged from the first dissolution vessel.

However, when the discharge time of the first dissolution vessel is extremely shorter than the time required for stirring in the first dissolution vessel, the discharge time $W^1/F^1$ may be ignored.

On the other hand, in the second dissolution vessel, the amount of the mixed solution of a dihydroxy compound and a carbonic acid diester fluctuates to produce a variation in the residence time of the mixed solution in the second dissolution vessel and therefore, the residence time $T^2$ of the second dissolution vessel is defined as the maximum residence time $T^2_{max}$ according to the element 4.

$$T^2_4=T^2_{max} \quad (20)$$

$T^2_4$: the residence time [hr] of the dihydroxy compound in the second dissolution vessel, and $T^2_{max}$: the maximum residence time [hr] of the mixed solution in the second dissolution vessel.

Accordingly, the residence time T in this example is expressed by the following formula:

$$T=T^1_1+T^2_4=t^1+W^1/F^1+T^2_{max} \quad (21)$$

Representative Example 3

In the case where a solid dihydroxy compound is charged into a first dissolution vessel and heated/melted and the molten solution is transferred to a second dissolution vessel, continuously mixed with a liquid carbonic acid diester in the second dissolution vessel and then discharged:

In this example, the first dissolution vessel assumes heating/melting of a raw material by a batch system and the second dissolution vessel assumes continuous mixing. The time from the point at which heating of the dihydroxy compound charged is started in the first dissolution vessel to the point at which the mixed solution of raw materials is discharged from the outlet of the second dissolution vessel is taken as the residence time T in dissolution vessel.

$$T = T^1 + T^2 \quad (22)$$

T: the residence time [hr] of the dihydroxy compound from the point at which heating of the dihydroxy compound charged is started in the first dissolution vessel to the point at which the mixed solution of raw materials is discharged from the outlet of the second dissolution vessel, $T^1$: the residence time [hr] of the dihydroxy compound in the first dissolution vessel, and $T^2$: the residence time [hr] of the dihydroxy compound in the second dissolution vessel.

In this example, the residence time in the first dissolution vessel can be divided into a residence time from the point at which heating is started to the point at which discharge is started, and a residence time in the discharge stage, and the sum thereof is taken as the residence time $T^1$ in the first dissolution vessel. Therefore, similarly to the first dissolution vessel of representative example 2, the following formula applies.

$$T^1 = T^1{}_1 + T^1{}_2 + t^1 + W^1/F^1 \quad (23)$$

$T^1{}_1$: the residence time [hr] of the dihydroxy compound in the first dissolution vessel from the point at which heating is started to the point at which discharge is started, $T^1{}_2$: the residence time [hr] of the dihydroxy compound in the dissolution vessel at the discharge stage, $t^1$: the time [hr] required for stirring in the first dissolution vessel, $W^1$: the amount [kg] of the dihydroxy compound in the first dissolution vessel, and $F^1$: the flow rate [kg/hr] of the dihydroxy compound discharged from the first dissolution vessel.

On the other hand, the residence time $T^2$ in the second dissolution vessel comes under the continuous mixing of the element 3 and therefore, the residence time $T^2$ is expressed by the following formula:

$$T^2 = T^2{}_3 = W^2/F^2 \quad (24)$$

$T^2{}_3$: the residence time [hr] of the dihydroxy compound in the second dissolution vessel, $W^2$: the amount [kg] of the dihydroxy compound in the second dissolution vessel, and $F^2$: the flow rate [kg/hr] of the dihydroxy compound discharged from the second dissolution vessel.

To summarize these, the residence time T in this example is expressed by the following formula:

$$T = T^1 + T^2 = t^1 + W^1/F^1 + W^2/F^2 \quad (25)$$

Representative Example 4

In the case where a molten mixture of a part of a predetermined amount of a dihydroxy compound and a carbonic acid diester is previously reserved in a first dissolution vessel and the remaining of the predetermined amount of the solid dihydroxy compound is fed thereto and completely dissolved:

In this example, the process can be divided into a storage stage where a molten mixture of a part of a predetermined amount of a dihydroxy compound and a carbonic acid diester is previously reserved in a first dissolution vessel, a stage where the remaining of the predetermined amount of a solid dihydroxy compound is fed to the first dissolution vessel and dissolved, and a stage where the dihydroxy compound is withdrawn from the first dissolution vessel. Here, the residence time in the storage stage where a molten mixture of a dihydroxy compound and a carbonic acid diester is previously reserved in the first dissolution vessel, and the residence time in the sage where the remaining of the predetermined amount of a solid dihydroxy compound is fed to the first dissolution vessel and dissolved, come under the element 1 because of no discharge from the dissolution vessel and are collectively treated as $T^1{}_1$.

$$T^1{}_1 = t^1 \quad (26)$$

$T^1{}_1$: the residence time of the molten mixture of a part of a predetermined amount of a dihydroxy compound and a carbonic acid diester, which is previously reserved in the first dissolution vessel, and the residence time in the stage where the remaining of the predetermined amount of a solid dihydroxy compound is fed to the first dissolution vessel and dissolved [hr], and $t^1$: the time for which the molten mixture is previously reserved in the first dissolution vessel, and the time required for the stage where the remaining of the predetermined amount of a solid dihydroxy compound is fed to the first dissolution vessel and dissolved [hr].

The residence time T in this representative example is the sum of the total $T^1{}_1$, of residence times of the element 1 in the first dissolution vessel and the residence time $T^1{}_2$ at the discharge stage from the first dissolution vessel and is expressed by the following formula (27):

$$T = T^1{}_1 + T^1{}_2 = t^1 + T^1{}_2 \quad (27)$$

T: the residence time [hr] of the dihydroxy compound from the point at which a molten mixture of a part of a predetermined amount of a dihydroxy compound and a carbonic acid diester is charged into the first dissolution vessel to the point at which, after feeding the remaining of the predetermined amount of a solid dihydroxy compound, the mixed solution of raw materials is discharged from the outlet of the first dissolution vessel.

Here, the residence time at the stage where the dihydroxy compound is withdrawn from the first dissolution vessel comes under the element 2.

$$T^1{}_2 = W^1/F^1 \quad (28)$$

$T^1{}_2$: the residence time [hr] of the dihydroxy compound at the withdrawal stage from the first dissolution stage, $W^1$: the amount [kg] of the mixed solution present inside the first dissolution vessel, and $F^1$: the flow rate [kg/hr] of the mixed solution discharged from the first dissolution vessel.

To summarize these, the following formula (29) results:

$$T = T^1{}_1 + T^1{}_2 = t^1 + W^1/F^1 \quad (29)$$

Isosorbide that is a kind of the dihydroxy compound (A) of the present invention has a relatively high melting heat among crystalline compounds and requires a large amount of heat for melting and therefore, when a solid is intended to melt by heating, the compound must be heated at a high temperature and is likely to undergo thermal deterioration. Therefore, a method where solid isosorbide is liquefied by feeding it into a liquid prepared by previously melting isosorbide, is particularly preferred, because there is no fear of giving an excessive heat quantity.

In the case where the dihydroxy compound (A) of the present invention in the solid state is dissolved by adding it to a dissolution vessel holding the dihydroxy compound (A) of the present invention in the liquefied state and thereafter, the dihydroxy compound (A) of the present invention is continuously discharged from the dissolution vessel, the element 2 applies. Assuming that the weight of the dihydroxy compound (A) of the present invention held inside the dissolution vessel is A [kg] and the discharge flow rate of the dihydroxy compound (A) is B [kg/hr], the residence time of the dihydroxy compound (A) of the present invention in the dissolution vessel is expressed by A/B [hr].

Also, in the case where the dihydroxy compound (A) of the present invention is continuously fed to a dissolution vessel and at the same time, continuously discharged, since the time initially spent previously melting the dihydroxy compound (A) of the present invention is not taken into account in the stationary state, the flow rate at the inflow of a substance into a dissolution vessel and the flow rate at the outflow of a substance from the dissolution vessel are equal and constant. Accordingly, the element 3 applies, and the residence time of the dihydroxy compound (A) of the present invention in the dissolution vessel is expressed by A/B [hr].

In both cases, the amount A [kg] of the dihydroxy compound (A) of the present invention in the dissolution vessel may contain that of a solid dihydroxy compound.

At this time, the residence time in the dissolution vessel is preferably within 5 hours, more preferably within 4 hours, and most preferably within 3 hours. Also, the time required for liquefying isosorbide that is a representative example of the dihydroxy compound (A) of the present invention is actually 0.05 hours or more, preferably 0.1 hours, more preferably 0.5 hours. If the feeding rate of a solid is too high, the molten solution can hardly maintain its temperature and may undergo solidification in the dissolution vessel or a transfer pipe to cause blockage. Accordingly, the elapse time A/B in the dissolution vessel to which solid isosorbide is fed preferably satisfies the condition of the following formula (I):

$$0.05 \leq A/B \leq 5 \quad (I)$$

The dihydroxy compound (A) of the present invention, particularly isosorbide, is a highly hygroscopic compound and when stored in a solid state, a large lump is liable to be produced due to consolidation. When a large lump is fed to a dissolution vessel, the melting takes an excessive time and therefore, the compound is preferably fed in a crushed state as finely as possible to the dissolution vessel. For the operation of crushing a lump, a conventionally known crusher is used. The solid dihydroxy compound fed to the dissolution vessel after crushing preferably contains, per kg, 10 or less, more preferably 5 or less, massive materials having a long diameter (maximum length) of 3 cm or more, and most preferably contains no massive material. If the compound is too finely crushed, deliquescence may occur or the solid may entrain air to allow for air migration in the dissolution vessel. For this reason, a lump having a long diameter of 1 mm or less is preferably not contained.

The dissolution vessel used for liquefying the dihydroxy compound (A) of the present invention needs to heat the dihydroxy compound and therefore, preferably has a heat exchanger through which a heating medium flows. Also, in order to shorten the melting time and prevent deterioration due to local overheating on the contact surface between the dihydroxy compound and the heating medium, the contents are preferably stirred using a stirrer.

The temperature to liquefy the dihydroxy compound (A) of the present invention or the temperature to maintain the molten state is preferably (melting point of the dihydroxy compound+50° C.) or less, more preferably (melting point of the dihydroxy compound+40° C.) or less, still more preferably (melting point of the dihydroxy compound+30° C.) or less. That is, the difference between the internal temperature of the dissolution vessel and the temperature of the heating medium is preferably 50° C. or less, more preferably 40° C. or less, still more preferably 30° C. or less.

In the case of using isosorbide as the dihydroxy compound of the present invention, the liquefaction temperature of the isosorbide is preferably 120° C. or less, more preferably 110° C. or less, still more preferably 100° C. or less, and most preferably 90° C. or less. That is, the internal temperature of the dissolution vessel is preferably 120° C. or less, more preferably 110° C. or less, still more preferably 100° C. or less.

If the internal temperature of the dissolution vessel exceeds 120° C., coloration of isosorbide itself may be caused and moreover, there may arise a problem that the reactivity is reduced. Incidentally, the lower limit of the temperature of the dissolution vessel is preferably 70° C., more preferably 75° C. If the temperature is less than 70° C., isosorbide may be crystallized to disadvantageously cause blockage in a pipe or the like.

In the case of using spiroglycol as the dihydroxy compound of the present invention, the liquefaction temperature of the spiroglycol is preferably 210° C. or less, more preferably 200° C. or less. The melting point of spiroglycol is about 200° C., but solid spiroglycol is charged in and mixed with a carbonic acid diester and can be thereby dissolved at 200° C. or less. That is, the internal temperature of the dissolution vessel is preferably 200° C. or less, more preferably 190° C. or less, still more preferably 185° C. or less.

If the internal temperature of the dissolution vessel exceeds 210° C., a ring-opening reaction of spiroglycol itself may occur, as a result, the resin may be crosslinked and gelled. Incidentally, the lower limit of the temperature of the dissolution vessel is preferably 170° C. or more, more preferably 175° C. or more. If the temperature is less than 170° C., spiroglycol may be crystallized to cause blockage in a pipe or the like.

In the case where a dihydroxy compound other than isosorbide or spiroglycol is used as the dihydroxy compound (A) of the present invention, the internal temperature of the dissolution vessel is appropriately determined by taking into account, for example, the melting point of the dihydroxy compound or the phase separation temperature when mixed with a carbonic acid diester.

Furthermore, if the difference between the internal temperature of the dissolution vessel and the temperature of the heating medium exceeds 50° C., there may arise a problem that the dihydroxy compound (A) of the present invention is locally heated on the contact surface with the heat exchanger and is readily deteriorated. Accordingly, the difference between the internal temperature of the dissolution vessel and the temperature of the heating medium is preferably 50° C. or less. Incidentally, there may be no difference between the internal temperature of the dissolution vessel and the temperature of the heating medium, and the lower limit of the difference may be 0° C. Also, the temperature of the heating medium may be lower than the internal temperature.

When the contact area of the heating medium is small for the volume of the dihydroxy compound inside the dissolution vessel, the heat transfer efficiency is impaired and therefore, the temperature of the heating medium must be raised. In this case, the liquid in the portion contacting with the heating medium is subject to local overheating to undergo thermal deterioration. If desired, an internal heat exchanger is provided in the dissolution vessel so as to increase the contact area between the dihydroxy compound and the heating medium, whereby the heat transfer efficiency can be enhanced and the dissolution can be completed at a lower temperature in a shorter time.

Assuming that the volume of the dihydroxy compound inside the dissolution vessel is V [$m^3$] and the contact area between the dihydroxy compound and the heat exchanger is S [$m^2$], V/S is preferably 0.3 or less, more preferably 0.25 or less, still more preferably 0.21 or less. The lower limit of V/S is preferably 0.1, more preferably 0.15. If V/S is less than 0.1, an excessive number of internal heat exchangers are provided in the dissolution vessel, making it impossible to ensure the necessary volume, and this is not realistic.

The dihydroxy compound (A) of the present invention is preferably liquefied using the dissolution vessels described above by connecting two or more thereof in series. In the dissolution vessel, the dihydroxy compound fed to a first vessel is usually a compound at a temperature of about room temperature and in order to raise the temperature to the melting temperature, the temperature of the heating medium must be higher than the temperature at which the molten state can be maintained. In this case, a portion whose melting is completed is also continuously exposed to a high temperature and therefore, is likely to undergo thermal deterioration. By transferring a liquid melted to a certain extent to a second vessel, the melting can be completed at a lower temperature than in the first vessel, because a large heat quantity need not be supplied in the second vessel. Furthermore, for suppressing the thermal deterioration, the temperature of the heating medium in the dissolution vessel on the downstream side is preferably set to be lower than the temperature of the heating medium in the dissolution vessel on the upstream side. In this case, the temperature difference is not particularly limited but is preferably 20° C. or more, more preferably 30° C. or more.

The dihydroxy compound (A) of the present invention is susceptible to oxidative deterioration and therefore, the inside of the apparatus in the raw material preparation process or polycondensation process is preferably kept in an inert gas atmosphere such as nitrogen or argon. Nitrogen is usually used in industry. In the case of charging a solid compound into the apparatus, air may be entrained by the solid and migrate into the apparatus, but air migration can be prevented by employing a method where the inside of a vessel that has received the dihydroxy compound is purged with an inert gas under reduced pressure or under pressure before charging the solid dihydroxy compound into the dissolution vessel or an inert gas is blown into the dissolution vessel. The oxygen concentration inside the dissolution vessel is preferably kept at 1,000 ppm by volume or less, more preferably 500 ppm by volume or less, by the method above.

Furthermore, in order to prevent the above-described oxidative deterioration, it is also preferred that an inert gas containing oxygen in an amount of 10 ppm by volume or less is blown into the dihydroxy compound liquid held in the dissolution vessel. The oxygen content of the inert gas is preferably 5 ppm by volume or less, and the lower limit thereof is preferably 0 ppm by volume.

In the present invention, a dihydroxy compound (B) other than the dihydroxy compound (A) of the present invention having a moiety represented by formula (1) in a part of the structure (hereinafter, referred to as another dihydroxy compound (B)) may be used as a raw material.

In the case of mixing and melting a plurality of kinds of dihydroxy compounds, the melting temperature must be set in accordance with a dihydroxy compound having a high melting point and therefore, a monomer having a low melting point is subject to a higher heat load than necessary. Because of this problem, the dihydroxy compound (A) of the present invention is preferably liquefied in a dissolution vessel different from that for the another dihydroxy compound (B).

Similarly to the dihydroxy compound (A) of the present invention, the another dihydroxy compound (B) is also preferably kept from thermal deterioration as much as possible in the raw material preparation process.

In the case where the melting point of the another dihydroxy compound (B) is higher than the melting point of a carbonic acid diester, this dihydroxy compound as a solid is fed to a liquid prepared by previously melting the carbonic acid diester, whereby the dihydroxy compound can be liquefied at a temperature lower than its melting point and the heat load applied to the raw material can be reduced. The liquefaction temperature or the temperature to maintain the liquefied state is preferably set to a temperature between the melting point of the dihydroxy compound and the carbonic acid ester.

As described above, the production of a polycarbonate resin by melt polycondensation generally uses a method where a dihydroxy compound and a carbonic acid diester used for reaction are previously mixed to give a predetermined molar ratio and the obtained mixture solution of raw materials is stored in the molten state. However, the dihydroxy compound (A) of the present invention is highly hydrophilic and therefore, when mixed with a carbonic acid diester or a low-polarity dihydroxy compound, the solution sometimes undergoes phase separation. Isosorbide has a melting point of about 60° C. but when mixed with diphenyl carbonate, a phase separation temperature appears at about 120° C. When such a condition is created, the temperature must be raised to a temperature not lower than the phase separation temperature so as to make a uniform solution, and an excessive heat load is applied. When the molten mixture of raw materials is in the phase-separated state, a liquid with a non-uniform composition may be sent when feeding the raw material to a reactor and the reaction may not proceed until a desired molecular weight is reached.

From these standpoints, in the present invention, the dihydroxy compound (A) of the present invention and the another dihydroxy compound (B) are preferably fed separately to a reactor or preferably mixed in a pipe immediately before a reactor and fed to the reactor. By individually feeding these compounds to a reactor by means of a metering pump, a vessel for mixing the raw materials need not be provided, and an extra residence time can be reduced. Furthermore, when a plurality of pipes are connected to the reactor, the pressure of the reactor becomes hard to control and therefore, it is particularly preferred to mix all dihydroxy compounds and the carbonic acid diester by using a static mixer in a pipe before feeding to a reactor. As described above, in the case where the mixture solution of raw materials is likely to undergo phase separation, the raw materials are preferably mixed by using a static mixer to uniformly disperse the solution. In this way, the raw material solution is preferably dispersed uniformly before feeding the raw materials to a reactor.

At the time of melting the raw material, an antioxidant may be added. Addition of a commonly known hindered phenol-based antioxidant or phosphorus-based antioxidant brings enhancement of storage stability of the raw material in the raw material preparation process or inhibition of coloring during polycondensation, whereby color hue of the obtained resin can be improved.

In order to prevent a raw material-derived extraneous matter from migrating into the product, the molten raw material is preferably filtered through a filter and then fed to a reactor. All dihydroxy compounds and a carbonic acid diester used for reaction are preferably filtered through a filter and then charged into a reactor, and it is more preferred that after mixing all raw materials, the mixture is filtered through a filter and then fed to a reactor, because the equipment can be simplified. That is, despite using a plurality of raw materials, a filter need not be provided for each raw material line but all raw materials can be mixed and then passed through one filter. In turn, the number of filters can be one and although pressure rise or the like needs to be monitored in using a filter, all that is required is to monitor one filter, facilitating the operation management. In the production method of the present invention, a reaction solution halfway the polycondensation reaction can be also filtered through a filter.

The shape of the filter may be of any type such as basket type, disk type, leaf disk type, tube type, flat cylindrical type and pleated cylindrical type, and among others, a pleat-type filter being compact and having a large filtration area is preferred. Also, the filter element constituting the filter may by any of, for example, a metal winding, a laminated metal mesh, a metallic nonwoven fabric and a porous metal sheet, but in view of filtration accuracy, a laminated metal mesh or a metallic nonwoven fabric is preferred, and a filter element of a type obtained by fixing a metallic nonwoven fabric through sintering is more preferred.

The material for the filter is not particularly limited and, for example, a metal-made filter, a resin-made filter or a ceramic-made filter may be used, but in view of heat resistance or reduction of coloration, a metal-made filter having an iron content of 80% or less is preferred, and a filter made of a stainless steel such as SUS304, SUS316, SUS316L and SUS310S is more preferred.

At the filtration of the raw material monomer, a plurality of filter units are preferably used so as to extend the filter life while ensuring the filter performance. In particular, assuming that the filter opening in a unit on the upstream side is C μm and the filter opening in a unit on the downstream side is D μm, C is preferably larger than D (C>D) in at least one combination of filter units. When this condition is satisfied, the filter is less likely to clog and the frequency of filter exchange can be reduced.

The filter opening is not particularly limited but, in at least one filter, the opening is preferably 10 μm or less in terms of 99.9% filtration accuracy. In the case where a plurality of filters are disposed, the opening is preferably 8 μm or more, more preferably 10 μm or more, on the most upstream side, and is preferably 2 μm or less, more preferably 1 μm or less, on the most downstream side.

Incidentally, the filter opening as used herein is an opening determined in accordance with ISO 16889 described above.

In the present invention, the temperature of the raw material fluid at the time of passing a raw material through a filter is not limited, but if the temperature is too low, the raw material may be solidified, whereas if the temperature is too high, there may occur a trouble such thermal decomposition. Therefore, the temperature is preferably from 100 to 200° C., more preferably from 100 to 150° C.

In order to inhibit an undesirable side reaction, the polycondensation catalyst is preferably fed to a raw material immediately before charging the raw material into a reactor.

The polycondensation catalyst used is usually prepared as an aqueous solution in advance. The concentration of the aqueous catalyst solution is not particularly limited and adjusted to an arbitrary concentration according to the solubility of the catalyst for water. Also, instead of water, another solvent such as acetone, alcohol, toluene and phenol may be selected. Incidentally, specific examples of the polycondensation catalyst are recited later. The property of water used for dissolving the catalyst is not particularly limited as long as the kind and concentration of an impurity contained are constant, but usually, for example, distilled water or deionized water is preferably used.

In the case where a copolymerized polycarbonate resin is produced using a plurality of kinds of dihydroxy compounds, the heat resistance, mechanical properties, optical characteristics and the like of the obtained polycarbonate resin can be adjusted by changing the compositional ratio of respective dihydroxy compounds, and there is a possibility that polycarbonate resins differing in the composition must be produced according to applications.

In the case of producing a polycarbonate resin by using a plurality of kinds of dihydroxy compounds and continuously performing a polycondensation reaction, when a dihydroxy compound and a carbonic acid diester are mixed to prepare a mixed solution of raw materials and the production is then shifted to production of a polycarbonate resin differing in the compositional ratio of dihydroxy compounds, switching of the composition in the raw material preparation vessel requires a long time and therefore, it takes time to completely switch the composition of the obtained polycarbonate resin. On the other hand, in the method where dihydroxy compounds are separately dissolved and fed to a reactor, the composition of dihydroxy compounds fed to a reactor can be momentarily switched by changing the flow rates of individually-provided metering pumps, so that the time required to switch the product can be greatly shortened and thanks to reduction in the raw material loss or transitional period, the yield or productivity of the product can be enhanced.

That is, in the case of producing a polycarbonate resin by using the dihydroxy compound (A) of the present invention and another dihydroxy compound (B) as raw materials and continuously performing polycondensation, these plurality of dihydroxy compounds are separately dissolved and fed to a reactor by using individually-provided metering pumps, whereby the process can have a composition switching step of changing the weight fraction of, out of the raw material composition fed to a reactor, at least one kind of a dihydroxy compound based on all dihydroxy compounds to a different weight fraction. Accordingly, when raw materials are fed to a reactor by using individually-provided metering pumps, the composition of the obtained polycarbonate resin can be switched in a short time by changing the flow rates of the individually-provided metering pumps, and the loss of the product can be kept to a minimum.

Switching of the composition as used in the present invention indicates that a step of changing the weight fraction of, out of the raw material composition fed to a reactor, at least any one dihydroxy compound based on all dihydroxy compounds to a different weight fraction is performed and the difference in the weight fraction between before and after the composition switching step is 1 wt % or more. In the case where the difference in the weight fraction is less than 1 wt %, this is in the range of fluctuation that could well occur in view of accuracy of the ratio of raw materials charged, and therefore, is not regarded as the composition switching. In the case of changing the weight fraction by 2 wt % or more, the above-described switching method is particularly effective.

<Outline of Production Process of Polycarbonate Resin>

In the method of the present invention, a polycarbonate resin is produced by causing the dihydroxy compounds and a carbonic acid diester to react (melt polycondensation) usually in the presence of a polycondensation catalyst by a multistage process of two or more stages using at least two reactors.

In the following, when a plurality of reactors are used, the reactor of a first vessel, the reactor of a second vessel, the reactor of a third vessel, . . . are referred to as a first reactor, a second reactor, a third reactor, . . . , respectively.

The polycondensation process is divided into two stages of former reaction and latter reaction. The former reaction is performed usually at a temperature 130 to 270° C., preferably from 150 to 230° C., for 0.1 to 10 hours, preferably from 0.5 to 3 hours, where a byproduct monohydroxy compound is distilled off and an oligomer is produced. In the latter reaction, the pressure of the reaction system is gradually lowered from the former reaction stage, the reaction temperature is also gradually lowered, and while removing a simultaneously generated monohydroxy compound from the reaction system, a polycondensation reaction is performed at a temperature of usually from 200 to 280° C., preferably from 210 to 260° C., by setting the pressure of the reaction system to finally reach 2 kPa or less, whereby a polycarbonate resin is produced. Incidentally, the pressure as used in the description of the present invention indicates a so-called absolute pressure expressed on the basis of vacuum.

The reactor used in the polycondensation process is obtained by, as described above, connecting at least two vessels, where a reaction product discharged from the outlet of a first reactor enters a second reactor. The number of reactors connected is not particularly limited but is preferably from 2 to 7, more preferably from 3 to 5, still more preferably 3 or 4. The type of the reactor is also not particularly limited, but it is preferred that the reactor for the former reaction has one or more vertical stirring reactors and the reactor for the latter reaction has one or more horizontal stirring reactors. In the method of the present invention, the reaction conditions in the horizontal stirring reactor at the final stage have an important effect not only on the quality of the obtained resin but also from various viewpoints such as production yield and amount of an extraneous matter in the resin.

In the case of providing a plurality of reactors, these are preferably set to stepwise raise the temperature and stepwise reduce the pressure from one reactor to another reactor.

Of these reactors, a reactor and a next reactor may be connected directly or may be connected through a preheater or the like, if desired. The pipe is preferably a pipe capable of transferring the reaction solution without cold solidification by employing a double pipe system or the like, where the polymer side is free from a gas phase and a dead space is not produced.

The upper limit temperature of the heating medium for heating each of the reactors above is usually 300° C., preferably 270° C., still more preferably 260° C. If the temperature of the heating medium is too high, thermal deterioration on the wall surface of the reactor may be accelerated to cause a trouble such as increase of a heterostructure or decomposition product or worsening of the color tone. The lower limit temperature is not particularly limited as long as it is a temperature capable of maintaining the above-described reaction temperature.

The reactor for use in the present invention may be any known reactor. Examples thereof include a jacket-type reactor using a hot oil or a steam as the heating medium, and a reactor having a coiled heat-transfer tube in the inside.

The method of the present invention is described more specifically below. The method of the present invention is performed by mixing, as raw material monomers, a dihydroxy compound containing a dihydroxy compound having a moiety represented by formula (1), such as isosorbide (ISB), and a carbonic acid diester such as diphenyl carbonate (DPC), each in the molten state, to prepare a molten mixture of raw materials (raw material preparation process), and subjecting these compounds in the molten state to a polycondensation reaction in the presence of a polycondensation catalyst through multiple stages using a plurality of reactors (polycondensation process). In the case of using DPC, a phenol byproduct is produced as a monohydroxy compound and therefore, the reaction is performed under reduced pressure and allowed to proceed by removing the phenol from the reaction system, whereby a polycarbonate is produced.

The reaction system may be any of a batch system, a continuous system, and a combination of a batch system and a continuous system, but in view of productivity and quality of the obtained product, a continuous system is preferred. In the method of the present invention, as the reactor, a plurality of vertical stirring reactors and subsequently, at least one horizontal stirring reactor are used. Usually, these reactors are disposed in series and the processing is continuously performed.

After the polycondensation process, for example, a step of devolatilizing and removing an unreacted raw material in the resin or a monohydroxy compound as a reaction byproduct, a step of adding a heat stabilizer, a release agent, a colorant and the like, a step of filtering the resin in the molten state through a filter to remove extraneous matters, and a step of extruding the resin in the molten state into a strand form and forming a pellet having a predetermined particle diameter, may be appropriately added.

The generated monohydroxy compound such as phenol is collected in a tank and in view of effective utilization of resources, this compound is preferably recovered after purification, if desired, and then reused as a raw material of DPC, bisphenol A or the like. In the production method of the present invention, the method for purifying the byproduct monohydroxy compound is not particularly limited, but a distillation method is preferably used.

Each step of the production method is described below.

<Former Reaction Step>

First, a mixture of the above-described dihydroxy compound and a carbonic acid diester are fed in the molten state to a vertical reactor and subjected to a polycondensation reaction usually at a temperature of 130 to 270° C.

This is continuously performed in a multi-vessel system using usually one vessel or more, preferably from 2 to 6 vessels, and from 40 to 95% of the byproduct monohydroxy compound is preferably distilled off. The reaction temperature is usually from 130 to 270° C., preferably from 150 to 240° C., and the pressure is from 40 to 1 kPa. In the case of a continuous reaction of a multi-vessel system, it is preferred to sequentially raise the temperatures of respective vessels within the range above and sequentially reduce the pressure of respective vessels within the range above. The average residence time is usually from 0.1 to 10 hours, preferably from 0.5 to 5 hours, more preferably from 0.5 to 3 hours.

If the temperature is too high, thermal deterioration may be accelerated to increase a heterostructure or a colored component, leading to worsening of the quality of the resin. On the other hand, if the temperature is too low, since the reaction rate drops, the productivity may be reduced.

The melt polycondensation reaction is an equilibrium reaction, in other words, the reaction is accelerated by removing the byproduct monohydroxy compound from the reaction system, and therefore, it is preferred to keep a decompressed state. The pressure is preferably from 1 to 40 kPa, more preferably from 5 to 30 kPa. If the pressure is too high, a monohydroxy compound is not distilled off, as a result, the reactivity may be reduced, whereas if the pressure is too low, a raw material such as unreacted dihydroxy compound and carbonic acid diester is distilled off, and control of the reaction may become difficult, for example, the molar ratio of raw materials may deviate to fail in reaching a desired molecular weight, or the raw material consumption rate may be worsened.

<Latter Reaction Step>

The oligomer obtained in the former polycondensation step is fed to a horizontal stirring reactor and subjected to a polycondensation reaction at a temperature of 200 to 280° C. to obtain a polycarbonate resin. This reaction is usually performed continuously by using one or more, preferably from 1 to 3, horizontal stirring reactors.

The reaction temperature is preferably from 210 to 270° C., more preferably from 220 to 260° C. The pressure is usually from 13.3 kPa to 10 Pa, preferably from 1 kPa to 50 Pa. The average residence time is usually from 0.1 to 10 hours, preferably from 0.5 to 5 hours, still more preferably from 0.5 to 2 hours.

<Reactor>

In the case of performing a polycondensation process in a multi-vessel system, a plurality of reactors including a vertical stirring reactor are usually provided to thereby increase the average molecular weight (reduced viscosity) of the polycarbonate resin.

Here, the reactor includes a vertical stirring reactor and a horizontal stirring reactor. Specific examples thereof include a stirring vessel-type reactor, a thin-film reactor, a centrifugal thin-film evaporation reactor, a surface renewal-type twin-screw kneading reactor, a twin-screw horizontal stirring reactor, a wet wall-type reactor, a porous plate-type reactor allowing polycondensation to proceed during a free fall, and a wire-attached porous plate-type reactor allowing polycondensation to proceed during a fall along the wire.

The vertical stirring reactor has a vertical rotating shaft and a stirring blade attached to the vertical rotating shaft. Examples of the type of the stirring blade include a turbine blade, a paddle blade, a Pfaudler blade, an anchor blade, a FULLZONE blade (manufactured by Shinko Pantec Co., Ltd.), a SANMELLER blade (manufactured by Mitsubishi Heavy Industries, Ltd.), a MAXBLEND blade (manufactured by Sumitomo Heavy Industries, Ltd.), a helical ribbon blade, and a lattice-type twisting blade (manufactured by Hitachi, Ltd.).

Also, the horizontal stirring reactor is a reactor having a transverse (horizontal) stirring-blade rotating shaft and mutually discontinuous stirring blades attached almost perpendicularly to the horizontal rotating shaft, and examples of the type of the stirring blade include a single-shaft stirring blade such as disk and paddle, and a two-shaft stirring blade such as HVR, SCR, N-SCR (manufactured by Mitsubishi Heavy Industries, Ltd.), Bivolak (manufactured by Sumitomo Heavy Industries, Ltd.) and spectacle-shaped or lattice blade (manufactured by Hitachi, Ltd.). Assuming that the length of the horizontal rotating shaft of the horizontal reactor is L and the rotation diameter of the stirring blade is D, L/D is preferably from 1 to 15, more preferably from 2 to 10.

In the reaction apparatus for use in the present invention, in view of color tone of the polycarbonate resin, the surface material of a component part, such as device or pipe constituting the reaction apparatus, in a portion coming into contact with a raw material monomer or a polycondensation solution (hereinafter referred to as "liquid-contact part") is preferably composed of one member or two or more members of stainless steel having a nickel content of 10 wt % or more, glass, nickel, tantalum, chromium and Teflon (registered trademark), in a ratio of at least 90% or more of the total surface area of the liquid-contact part. In the present invention, it is sufficient if the surface material in the liquid-contact part is composed of the above-described substance, and a laminated material of the above-described substance and another substance or a material obtained by plating another substance with the above-described substance can be used as the surface material.

<Steps after Polycondensation Reaction>

The polycarbonate resin of the present invention is, after the above-described polycondensation reaction, passed still in the molten state through a filter so as to filter extraneous matters. Among others, for effecting removal of low-molecular-weight ingredients contained in the resin or addition/kneading of a heat stabilizer and the like, it is preferred that the resin obtained by polycondensation is introduced into an extrude and subsequently the resin discharged from the extruder is filtered by using a filter.

In the present invention, examples of the method for filtering the polycarbonate resin by using a filter include a method where the resin is withdrawn in the molten state from a final polycondensation reactor by using a gear pump, a screw or the like so as to generate a pressure necessary for filtration and filtered through a filter; a method where the resin is fed in the molten state to a single-screw or twin-screw extruder from a final polycondensation reactor, melt extruded, filtered through a filter, cooled/solidified in the form of a strand, and then pelletized by a rotary cutter or the like; a method where the resin is fed in the molten state to a single-screw or twin-screw extruder from a final polycondensation reactor, melt extruded, once cooled/solidified in the form of a strand and pelletized and thereafter, the pellet is again introduced into an extruder, filtered through a filer, cooled/solidified in the form of a strand and then pelletized; and a method where the resin is withdrawn in the molten state from a final polycondensation reactor, cooled/solidified in the form of a strand without passing through an extruder and once pelletized and thereafter, the pellet is fed to a single-screw or twin-screw extruder, melt extruded, filtered through a filer, cooled/solidified in the form of a strand and then pelletized. Among these, in order to keep the heat history to a minimum and prevent thermal deterioration such as worsening of color hue or reduction in the molecular weight, preferred is a method where the resin is fed in the molten state to a single-screw or twin-screw extruder from a final polycondensation reactor, melt extruded, directly filtered through a filter, cooled/solidified in the form of a strand and then pelletized by a rotary cutter or the like.

In the present invention, the form of the extruder is not limited, but a single-screw or twin-screw extruder is usually used. Among others, for enhancing the later-described devolatization performance or achieving uniform kneading of an additive, a twin-screw extruder is preferred. In this case, the shaft rotations may be in different directions or in the same direction but in view of kneading performance, preferably in the same direction. Use of an extrude can stabilize feed of the polycarbonate resin to a filter.

The polycarbonate resin obtained as above by polycondensation usually allows for remaining of a raw material monomer having the possibility of adversely affecting the color hue or thermal stability as well as the product by causing bleedout or the like, a byproduct monohydroxy compound generated in the polycondensation reaction, and a low-molecular-weight compound such as polycarbonate oligomer, but it is also possible to devolatilize/remove these by using an extruder having a vent opening, preferably by decompression through the vent opening by means of a vacuum pump or the like. In addition, the devolatilization may be accelerated by introducing a volatile liquid such as water into the extruder. The number of vent openings may be one or plural but is preferably 2 or more.

Furthermore, in the extruder, commonly known additives such as heat stabilizer, neutralizer, ultraviolet absorber, release agent, colorant, antistatic agent, slip agent, lubricant, plasticizer, compatibilizer and flame retardant may be added and knead.

In the present invention, at the strand formation or pelletization allowing the polycarbonate resin to directly contact with outside air, in order to prevent migration of an extraneous matter from the outside air, the operation is preferably performed in a clean room with a cleanliness higher than class 7, more preferably higher than class 6, as defined in JIS B9920 (2002).

The polycarbonate resin filtered through a filter is cooled/solidified and then pelletized by a rotary cutter or the like, and at the pelletization, a cooling method such as air cooling and water cooling is preferably used. As for the air used in air cooling, an air after previously removing an airborne extraneous matter through a hepafilter or the like is preferably used so as to prevent reattachment of an airborne extraneous matter. In the case of using water cooling, water after removing a metallic matter in water by means of an ion exchange resin or the like and further removing an extraneous matter in water through a filter is preferably used. The opening size of the filter used is preferably from 10 to 0.45 μm in terms of filtration accuracy for 99.9% rejection.

<One Example of Production Apparatus>

One example of the method of the present invention to which this embodiment is applied is specifically described below by using FIG. 1. The production apparatus, raw material and catalyst described below are merely an example of the embodiment of the present invention, and the present invention is not limited to these examples.

Figure 2:
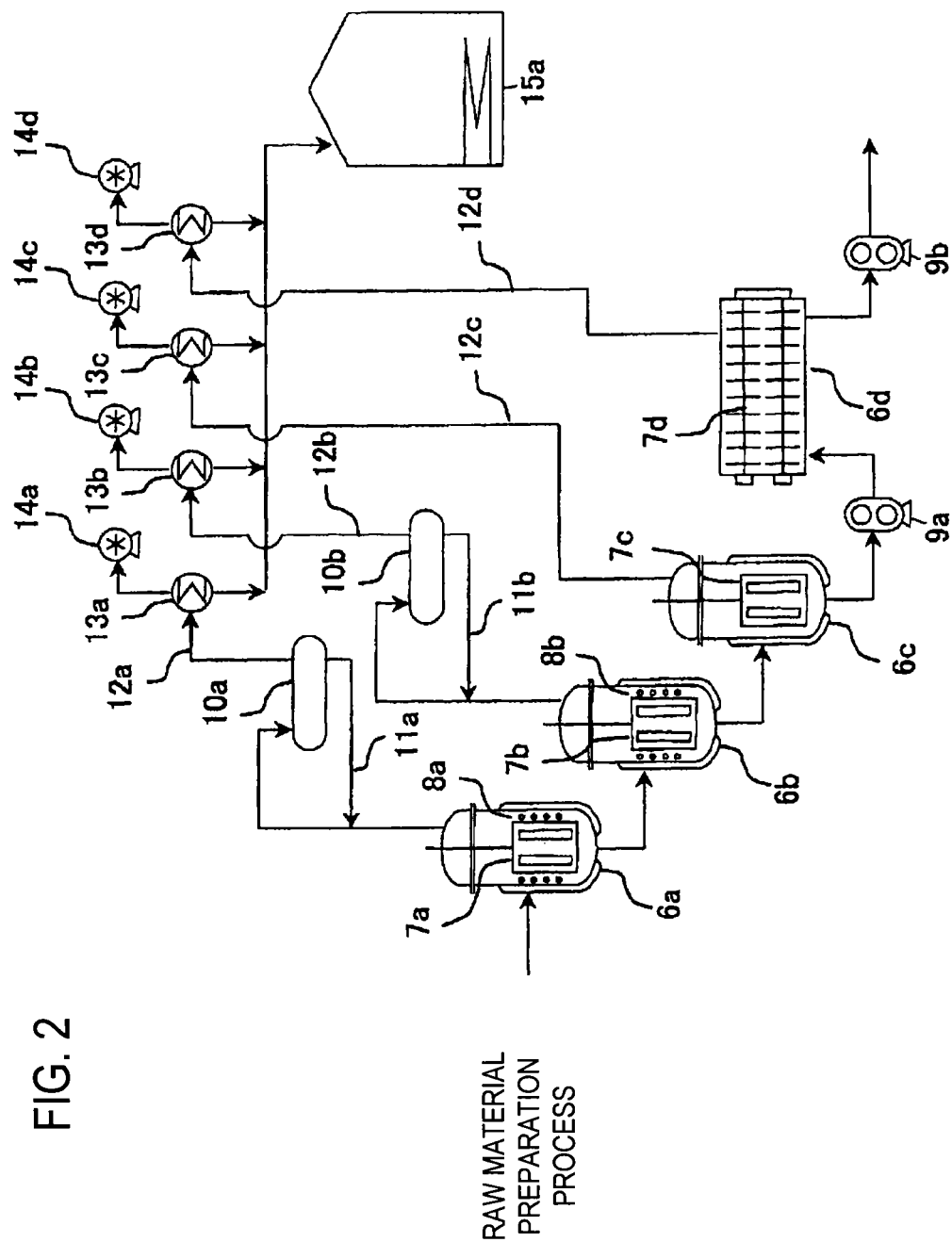
FIG. 2 is a process chart showing the polycondensation process in the production method of the present invention.

Each of FIGS. 1 and 2 is a view illustrating an example of the production apparatus for use in the method of the invention. FIG. 1 shows a raw material preparation process where a dihydroxy compound and a carbonic acid diester are melted, mixed with a polycondensation catalyst and fed to a reactor. FIG. 2 shows a polycondensation process where these raw materials are subjected in the molten state to a polycondensation reaction by using a plurality of reactors.

In the following, the production apparatus is described by referring, as an example, to a case of using ISB and 1,4-cyclohexanedimethanol (CHDM) as the raw material dihydroxy compound and using DPC as the raw material carbonic acid diester.

ISB is charged into a hopper 1b from a flexible container 1a and in the case where a lump is produced due to consolidation, the compound is crushed by a crusher 1c to a size of a maximum diameter of 2 cm or less. Subsequently, ISB is fed to a dissolution vessel 1d and melted. ISB discharged from the bottom is fed to a dissolution vessel 1g. The feed rate and discharge rate of ISB of the dissolution vessel 1d and the dissolution vessel 1g and the liquid levels of respective dissolution vessels are kept constant. ISB discharged from the bottom of the dissolution vessel 1g by an ISB metering feed pump 2d is mixed in a pipe with separately melted CHDM and DPC, and fed to a reactor through a static mixer 5a and a raw material filter 5b.

In the dissolution vessel 1d, the quantity of heat supplied sometimes becomes large in particular and therefore, an internal heat exchanger 1e is provided so as to prevent the temperature of the heating medium from rising excessively. Also, in the dissolution vessel 1d, an upper-paddle-blade lower-anchor-blade stirring blade 1f is used to perform the stirring more efficiently.

CHDM is transferred to a CHDM dissolution vessel 2c by a CHDM feed pump 2b after lowering the viscosity by heating a drum 2a, continuously discharged from the bottom by a CHDM metering feed pump 2d, mixed with separately melted ISB and DPC in the pipe, and fed to the reactor through the static mixer 5a and the raw material filter 5b.

DPC fed from a DPC feed line 3a by a DPC metering feed pump 3b is continuously mixed with separately melted ISB and CHDM in the pipe and fed to the reactor through the static mixer 5a and the raw material filter 5b.

The mixture solution of raw materials is fed to the reactor through the static mixer 5a and the raw material filter 5b, and before the reactor, a polymerization catalyst in the form of an aqueous solution is fed from a catalyst tank 4a by a catalyst metering feed pump 4b and mixed.

In the polycondensation process of the production apparatus shown in FIG. 2, a first vertical stirring reactor 6a, a second vertical stirring reactor 6b, a third vertical stirring reactor 6c, and a fourth horizontal stirring reactor 6d are provided in series. In each reactor, a polycondensation reaction is performed by keeping the liquid level constant, and the polycondensation reaction solution discharged from the bottom of the first vertical stirring reactor 6a is continuously fed in sequence to the second vertical stirring reactor 6b, then to the third vertical stirring reactor 6c and further to the fourth horizontal stirring reactor 6d, thereby allowing a polycondensation reaction to proceed. The reaction conditions in respective reactors are preferably set to shift to a higher temperature, a higher vacuum and a lower stirring speed with the progress of the polycondensation reaction.

The first vertical stirring reactor 6a, the second vertical stirring reactor 6b and the third vertical stirring reactor 6c are provided with MAXBLEND blades 7a, 7b and 7c, respectively. The fourth horizontal stirring reactor 6d is provided with a two-shaft spectacle-shaped stirring blade 7d. After the third vertical stirring reactor 6c and the fourth horizontal stirring reactor 6d, the reaction solution on transfer has a high viscosity and therefore, gear pumps 9a and 9b are provided.

In the first vertical stirring reactor 6a and the second vertical stirring reactor 6b, the amount of heat supplied sometimes becomes large in particular and therefore, internal heat exchangers 8a and 8b are provided, respectively, so as to prevent the temperature of the heating medium from rising excessively.

Incidentally, in these four reactors, distillation tubes 12a, 12b, 12c and 12d for discharging a byproduct and the like produced by the polycondensation reaction are attached, respectively. In the first vertical stirring reactor 6a and the second vertical stirring reactor 6b, reflux condensers 10a and 10b and reflux tubes 11a and 11b are provided, respectively, so as to return a part of the liquid distillate to the reaction system. The reflux ratio can be controlled by appropriately adjusting each of the pressure of the reactor and the temperature of the heating medium of the reflux condenser.

The distillation tubes 12a, 12b, 12c and 12d are connected to condensers 13a, 13b, 13c and 13d, respectively, and each reactor is kept in a predetermined decompressed state by a decompressor 14a, 14b, 14c or 14d.

A byproduct such as phenol (monohydroxy compound) is continuously sent from the condensers 13a, 13b, 13c, and 13d attached to respective reactors to a recovery tank 15a, then liquefied and recovered. Also, a cold trap (not shown) is provided on the downstream side of the condensers 13c and 13d attached to the third vertical stirring reactor 6c and the fourth horizontal stirring reactor 6d, respectively, and a byproduct is continuously solidified and recovered.

The reaction solution that has reached a predetermined molecular weight is withdrawn from the fourth horizontal stirring reactor 6d, transferred by a gear pump 9b, and pelletized into a product. An extruder or a polymer filter may be provided before pelletization. The reaction solution is transferred to the extruder. By providing a vacuum vent in the extruder, low molecular ingredients remaining in the polycarbonate resin are removed, and, if desired, an antioxidant, a light stabilizer, a colorant, a release agent and the like are added. By passing the polycarbonate resin still in the molten state through the polymer filter, an extraneous matter is filtered. The molten resin is drawn into a strand from a die head, and the resin is cooled with water and then pelletized by a strand cutter. In this case, when the reaction solution is treated by an extruder or a polymer filter without being solidified, the heat history applied to the polycarbonate resin can be minimized.

<Start of Melt Polycondensation in Continuous Production Apparatus>

In this embodiment, the polycondensation based on the polycondensation reaction of a dihydroxy compound and a carbonic acid diester is started according to the following procedure.

First, in the continuous production apparatus shown in FIG. 2, each of four reactors connected in series (first vertical stirring reactor 6a, second vertical stirring reactor 6b, third vertical stirring reactor 6c, and fourth horizontal stirring reactor 6d) is previously set to a predetermined internal temperature and a predetermined pressure. Here, the internal temperature of each reactor, the temperature of the heating medium, and the pressure are not particularly limited but are preferably set as follows.

(First Vertical Stirring Reactor 6a)

Internal temperature: from 130 to 240° C., pressure: from 40 to 10 kPa, temperature of heating medium: from 130 to 260° C., reflux ratio: from 0.01 to 10.

(Second Vertical Stirring Reactor 6b)

Internal temperature: from 150 to 250° C., pressure: from 40 to 8 kPa, temperature of heating medium: from 150 to 260° C., reflux ratio: from 0.01 to 5.

(Third Vertical Stirring Reactor 6c)

Internal temperature: from 170 to 260° C., pressure: from 10 to 1 kPa, temperature of heating medium: from 170 to 260° C.

(Fourth Horizontal Stirring Reactor 6d)

Internal temperature: from 210 to 260° C., pressure: from 1 kPa to 10 Pa, temperature of heating medium: from 210 to 260° C.

Next, in the raw material preparation process of FIG. 1, a molten mixture of a dihydroxy compound and a carbonic acid diester is prepared through the above-described steps. After the internal temperature and pressure of each of those four reactors have reached the range of ±5% of respective preset values, raw materials are continuously fed to a reactor at a constant flow rate by adjusting the flow rate of each metering feed pump so that the dihydroxy compound and the carbonic acid diester can have a predetermined molar ratio. Simultaneously with the start of feeding of the molten mixture of raw materials, a catalyst is continuously fed by a catalyst metering feed pump 4b to start a polycondensation reaction.

In the first vertical stirring reactor 6a where a polycondensation reaction is performed, the liquid level of the polycondensation reaction solution is kept constant so as to obtain a predetermined average residence time. The method for keeping the liquid level in the first vertical stirring reactor 6a constant includes usually a method of controlling the degree of opening of a valve (not shown) provided in a polymer discharge line at the bottom while detecting the liquid level by a level gauge or the like.

Subsequently, the polycondensation reaction solution is, in a sequential and continuous manner, discharged from the bottom of the first vertical stirring reactor 6a, fed to the second vertical stirring reactor 6b, then discharged from the bottom of the second vertical stirring reactor 6b, and fed to the third vertical stirring reactor 6c. In this former reaction step, byproduct phenol is distilled off in a ratio of 50 to 95% based on the theoretical amount, and an oligomer is produced.

Thereafter, the oligomer obtained in the former reaction step is transferred by the gear pump 9a and fed to the fourth horizontal stirring reactor 6d having a horizontal rotating shaft and mutually discontinuous stirring blades attached almost perpendicularly to the horizontal rotating shaft, in which assuming that the length of the horizontal rotating shaft is L and the rotation diameter of the stirring blade is D, L/D is from 1 to 15, and under the temperature and pressure conditions suitable for performing a latter reaction described below, byproduct phenol and a part of an unreacted monomer are removed to the outside of the system through the distillation tube 12d, whereby a polycarbonate is produced.

The horizontal stirring reactor is a horizontal high-viscosity liquid processing apparatus having one horizontal rotating shaft or two or more horizontal rotating shafts, where stirring blades such as disk type, wheel type, paddle type, bar type and window frame type are disposed individually or in combination of two or more on the horizontal rotating shaft to make at least two or more stages per rotating shaft and surface renewal of the reaction solution is effected by agitating or spreading the reaction solution with the stirring blade.

Incidentally, the term "surface renewal of the reaction solution" as used in this description means that the reaction solution on the liquid surface is replaced by the reaction solution below the liquid surface.

In this way, the horizontal stirring reactor for use in the present invention is an apparatus having a horizontal shaft and mutually discontinuous stirring blades attached almost perpendicularly to the horizontal shaft and does not have a screw portion unlike an extruder. In the method of the present invention, it is preferred to use at least one vessel of such a horizontal stirring reactor.

The reaction temperature in the latter reaction step is usually from 200 to 280° C., preferably from 210 to 260° C., and the reaction pressure is usually from 13.3 kPa to 10 Pa, preferably from 2 kPa to 20 Pa, more preferably from 1 kPa to 50 Pa.

In the method of the present invention, when a reactor giving a large holdup volume because of apparatus structure as compared with a twin-screw vented extruder is used as the horizontal stirring reactor, it becomes possible not only to appropriately set the residence time of the reaction solution but also to lower the temperature thanks to suppression of shear heat generation, whereby a polycarbonate resin with a more improved color tone and excellent mechanical properties can be obtained.

As described above, in this embodiment, in the continuous production apparatus shown in FIG. 2, melt polycondensation based on a polycondensation reaction is started by continuously feeding a molten mixture of raw materials and a catalyst fed through a preheater after the internal temperature and pressure of each of four reactors have reached predetermined values.

Therefore, immediately after the start of melt polycondensation, the average residence time of the polycondensation reaction solution in each reactor becomes equal to that in stationary operation. As a result, the polycondensation reaction solution is not subject to an excessive heat history, and an extraneous matter such as gel and burn deposit produced in the obtained polycarbonate resin is reduced. The color tone is also improved.

The molecular weight of the polycarbonate resin of the present invention obtained in this way can be expressed by a reduced viscosity, and the reduced viscosity is usually 0.20 dL/g or more, preferably 0.30 dL/g or more, and on the other hand, usually 1.20 dL/g or less, preferably 1.00 dL/g or less, more preferably 0.80 dL/g or less. If the reduced viscosity of the polycarbonate resin is too low, the mechanical strength of the molded article may decrease, whereas if the reduced viscosity is too high, flowability during molding tends to deteriorate, reducing the productivity or moldability. Incidentally, as for the reduced viscosity, a solution having a polycarbonate resin concentration precisely adjusted to 0.6 g/dL is prepared by using methylene chloride as the solvent and measured by means of an Ubbelohde viscometer at a temperature of 20.0° C.±0.1° C.

The polycarbonate resin of the present invention can be formed into a molded article by a commonly known method such as injection molding method, extrusion molding method or compression molding method. The molding method of the polycarbonate resin is not particularly limited, but an appropriate molding method is selected according to the shape of the molded article. In the case where the molded article has a film or sheet form, an extrusion molding method is preferred, and in the injection molding method, a degree of freedom of the molded article is obtained.

In the polycarbonate resin of the present invention, before performing various moldings, additives such as heat stabilizer, neutralizer, ultraviolet absorber, release agent, colorant, antistatic agent, slip agent, lubricant, plasticizer, compatibilizer and flame retardant can be mixed, if desired, by a tumbler, a supermixer, a floater, a V-blender, a Nauta mixer, a Banbury mixer, an extruder or the like.

The polycarbonate resin of the present invention may be also used as a polymer alloy by kneading it with, for example, one member or two or more members of a synthetic resin such as aromatic polycarbonate resin, aromatic polyester resin, aliphatic polyester resin, polyamide resin, polystyrene resin, polyolefin resin, acryl resin, amorphous polyolefin resin, ABS and AS, a biodegradable resin such as polylactic acid and polybutylene succinate, and rubber.

EXAMPLES

The present invention is described in greater detail below by referring to Examples, but the present invention is not limited to these Examples as long as the purport thereof is observed.

In the following, the compositional analysis and evaluations of physical properties of each of the reaction solution, the liquid distillate and the polycarbonate resin were performed by the methods described below.

Abbreviations of compounds used in Examples are as follows.

ISB: Isosorbide (trade name: POLYSORB PS, produced by Roquette Freres)

CHDM: 1,4-Cyclohexanedimethanol (trade name: SKY CHDM, produced by New Japan Chemical Co., Ltd.)

SPG: Spiroglycol (produced by Mitsubishi Chemical Corp.)

DPC: Diphenyl carbonate (produced by Mitsubishi Chemical Corp.)

1) Content of Formic Acid in ISB

About 4 g of the sample was precisely weighed in a 10 mL-volume measuring flask and dissolved by adding demineralized water and after quantitatively determining formic acid from the area value of a predetermined peak in liquid chromatography by an absolute calibration method, the content was calculated.

The apparatus and conditions used are as follows.
Apparatus: manufactured by Shimadzu Corp.
   System controller: CBM-20A
   Pump: LC-10AD
   Column oven: CTO-10ASvp
   Detector: SPD-M20A
   Analysis column: Cadenza CD-18; 4.6 mmϕ×250 mm
   Oven temperature: 40° C.
Detection wavelength: 220 nm
Eluent: aqueous 0.1% phosphoric acid solution
Flow rate: 1 mL/min
Sample injection amount: 20 μL 2) Content of Furfural in ISB About 4 g of the sample was precisely weighed in a 10 mL-volume measuring flask and dissolved by adding demineralized water and after quantitatively determining furfural from the area value of a predetermined peak in liquid chromatography by an absolute calibration method, the content was calculated.

The apparatus and conditions used are as follows.
Apparatus: manufactured by Shimadzu Corp.
   System controller: CBM-20A
   Pump: LC-10AD
   Column oven: CTO-10ASvp
   Detector: SPD-M20A
   Analysis column: Cadenza CD-18; 4.6 mmϕ×250 mm
   Oven temperature: 40° C.
Detection wavelength: 273 nm
Eluent: demineralized water/acetonitrile/phosphoric acid=70/30/0.1
Flow rate: 1 mL/min
Sample injection amount: 10 μL 3) pH of ISB In a beaker, 15 g of the sample was weighed and dissolved by adding 50 g of demineralized water. In this solution, a glass electrode GTPH1B (manufactured by Mitsubishi Chemical Analytech Co., Ltd.) previously calibrated by standard solutions of pH 4, pH 7 and pH 9 was dipped to thereby measure the pH.

4) Color Tone (Solution YI) of ISB

In a beaker, 20 g of the sample was weighed and dissolved by adding 20 g of demineralized water. The solution was put into a glass cell having an optical path length of 2 cm and measured by a spectrocolorimeter CM-5 (manufactured by Konica Minolta Inc.) in transmission mode to determine the yellow index (YI) value of the solution. A smaller YI value indicates a lesser yellow tint.

5) Color Tone (Solution YI) of Mixture of Raw Materials

In a beaker, 20 g of the sample was weighed and dissolved by adding 20 g of acetone. The solution was put into a glass cell having an optical path length of 2 cm and measured by a spectrocolorimeter CM-5 (manufactured by Konica Minolta Inc.) in transmission mode to determine the yellow index (YI) value of the solution. A smaller YI value indicates a lesser yellow tint.

6) Reduced Viscosity

A polycarbonate resin solution having a concentration of 0.6 g/dL was prepared by using methylene chloride as a solvent and measured at a temperature of 20.0° C.±0.1° C. by using an Ubbelohde viscosity tube manufactured by Moritomo Rika Kogyo, and the relative viscosity $\eta_{rel}$ was determined from the flow-through time $t_0$ of the solvent and the flow-through time t of the solution according to the following formula:

$$\eta_{rel}=t/t_0$$

The specific viscosity $\eta_{sp}$ was determined from the relative viscosity according to the following formula:

$$\eta_{sp}=(\eta-\eta_0)/\eta_0=\eta_{rel}-1$$

The reduced viscosity $\eta_{sp}/c$ was determined by dividing the specific viscosity by the concentration c (g/dL). A higher value indicates a larger molecular weight.

7) YI Value of Pellet of Polycarbonate Resin

The color hue of the polycarbonate resin was evaluated by measuring the YI value (yellow index value) in the reflected light on a pellet in accordance with ASTM D1925. As the apparatus, a spectrocolorimeter CM-5 manufactured by Konica Minolta Inc. was used, and as the measurement conditions, a measurement diameter of 30 mm and SCE were selected. Calibration glass CM-A212 for dish measurement was fitted into the measurement part, and a zero calibration box CM-A124 was put thereon to perform zero calibration. Subsequently, white calibration was performed using the built-in white calibration board. The measurement was performed using a white calibration board CM-A210, and it was confirmed that L* is 99.40±0.05, a* is 0.03±0.01, b* is −0.43±0.01, and YI is −0.58±0.01. The measurement of a pellet was performed by packing the pellets to a depth of about 40 mm of a cylindrical glass vessel having an inner diameter of 30 mm and a height of 50 mm. An operation of taking out the pellets from the glass vessel and again performing the measurement was repeated twice, and the average of measured values of three measurements in total was used. A smaller YI value indicates a lesser yellow tint of the resin and a more excellent color tone.

Incidentally, various analysis values of ISB used in Examples, before dissolution, are shown in Table 1.

TABLE 1

| Analysis Item | | Analysis Value |
|---|---|---|
| Formic acid content | ppm by weight | 0.1 to 0.2 |
| Furfural content | ppb by weight | 0.7 to 1.2 |
| pH | — | 7.6 to 8.0 |
| Solution YI | — | 0.27 to 0.28 |

Example 1

A mixed solution of ISB, CHDM and DPC was prepared in the raw material preparation process shown in FIG. 1.

ISB packaged in a flexible container was charged from a hopper 1b and after a lump produced due to consolidation was crushed by a crusher 1c to a size of a maximum diameter of 2 cm or less, transferred to a dissolution vessel 1d (first dissolution vessel) having an upper-paddle-blade lower-anchor-blade stirring blade 1f and an internal heat exchanger 1e in which a heating medium flows. Nitrogen was flowed in the crusher 1c and a pipe connecting the crusher 1c and the dissolution vessel 1d. The temperature of the heating medium was adjusted such that the internal temperature of the dissolution vessel 1d becomes 80° C., and the residence time was set to 1.5 hours by adjusting the liquid amount while controlling the degree of opening of a valve (not shown) provided in a discharge line at the bottom. A nitrogen inlet tube was attached to the inside of the dissolution vessel 1d (not shown), and nitrogen having an oxygen concentration of 5 ppm by volume or less was blown into the liquid of the dissolution vessel 1d to cause bubbling. The oxygen concentration inside the dissolution vessel 1d was less than 500 ppm by volume in the stationary state. ISB discharged from the bottom of the dissolution vessel 1d was fed to a dissolution vessel 1g (second dissolution vessel). The internal temperature and the residence time in the dissolution vessel 1g were adjusted to 70° C. and 1.5 hours, respectively. Molten ISB was continuously discharged from the bottom of the dissolution vessel 1g by a metering feed pump 1h, mixed with separately molten CHDM and DPC and, as a polycondensation catalyst, calcium acetate monohydrate to have a given molar ratio (ISB/CHDM/DPC/Ca=0.700/0.300/1.000/1.5×10$^{-6}$) and fed to a reactor. The residence time of raw materials in a transfer pipe from the dissolution vessel 1g to the reactor was within 3 minutes. Accordingly, the time from mixing of ISB and DPC to feeding to the reactor is within 3 minutes.

CHDM was received in a CHDM dissolution vessel 2c by a CHDM feed pump 2b after lowering the viscosity of CHDM by heating a drum. The dissolution vessel 2c was kept at an internal temperature of 70° C., and CHDM was continuously discharged from the bottom by a CHDM metering feed pump 2d and mixed with ISB and DPC. DPC was used after reducing the chloride ion concentration to 10 ppb or less by distillation/purification (not shown). Molten DPC was fed by a DPC metering feed pump 3b.

The mixture solution of raw materials was fed to a reactor through a static mixer 5a and a raw material filter 5b. Before the reactor, calcium acetate monohydrate as a polycondensation catalyst was fed by a catalyst metering pump 4b to account for 1.5 μmol per mol of all dihydroxy compounds.

An ISB molten solution and a molten mixture of raw materials were sampled from a valve attached after the ISB metering feed pump 1h and a valve attached before the raw material filter 5b, respectively, and subjected to various analyses described above.

Subsequently, the mixture solution of raw materials was sent to the polycondensation process shown in FIG. 2, and a polycarbonate resin was produced under the following conditions by a continuous production apparatus having three vertical stirring reactors and one horizontal stirring reactor.

First, each reactor was previously set to the internal temperature/pressure according to the reaction conditions as shown in Table 2.

Next, ISB, CHDM, DPC and the polycondensation catalyst mixed at a given molar ratio in the raw material preparation process were continuously fed to a first vertical stirring reactor 6a controlled to the ranges of ±5% of the predetermined temperature/pressure, and the liquid level was kept constant to give an average residence time of 80 minutes while controlling the degree of opening of a valve (not shown) provided in a polymer discharge line at the bottom.

Subsequently, the polycondensation reaction solution discharged from the bottom of the first vertical stirring reactor 6a was sequentially and continuously fed to the second vertical stirring reactor 6b, to the third vertical stirring reactor 6c, and to the fourth horizontal stirring reactor 6d (two-shaft spectacle-shaped blade, L/D=4). During the polymerization reaction, the liquid level of each reactor was controlled to give the average residence time shown in Table 2, and the reaction solution withdrawn from the fourth horizontal stirring reactor 6d was transferred by a gear pump 9b to a pelletization step where the solution was drawn into a strand and pelletized by a cutter (not shown).

The subsequent operation was optimized by adjusting the pressure of the fourth horizontal stirring reactor 6d so that the reduced viscosity at the outlet of the fourth horizontal stirring reaction can fall in the range of 0.44 to 0.47. The pressure adjustable range when performing the operation for 24 hours was from 0.4 to 0.5 kPa, and the pellet YI was changed in the range of 8.5 to 9.1. A polycarbonate resin with little fluctuation in molecular weight or color tone was obtained by an operation under nearly constant reaction conditions.

The results are shown in Table 3.

Example 2

The preparation process was performed in the same manner as in Example 1 except that nitrogen bubbling in the dissolution vessel 1d was stopped at the time of dissolving ISB. The oxygen concentration inside the dissolution vessel 1d was 1,500 ppm by volume in the stationary state. The analysis values of the sampled ISB showed that as compared with Example 1, the contents of formic acid and furfural were increased, the reduction in pH or the degree of coloration was large, and the color tone of the mixture solution of raw materials was slightly worsened, suggesting progress of deterioration in the dissolution step.

Using raw materials prepared as above, the polymerization process was performed in the same manner as in Example 1. The color tone of the obtained polycarbonate resin was slightly worsened as compared with Example 1. The results are shown in Table 3.

Example 3

When dissolving ISB, this was dissolved using only one vessel of the dissolution vessel 1d. The residence time in the dissolution vessel 1d was set to 1.5 hours and the internal temperature of the dissolution vessel was adjusted not to allow for remaining of undissolved ISB, as a result, the temperature had to be raised to 100° C. The analysis values of ISB showed that as compared with Example 1, the contents of formic acid and furfural were increased, the reduction in pH or the degree of coloration was large, and the color tone of the mixture solution of raw materials was slightly worsened, suggesting progress of deterioration in the dissolution step.

Using raw materials prepared as above, the polymerization process was performed in the same manner as in Example 1. Then, the color tone of the obtained polycarbonate resin was slightly worsened as compared with Example 1. The results are shown in Table 3.

Comparative Example 1

Molten DPC was charged into the same first dissolution vessel (not shown) as the dissolution vessel 1d and subsequently, CHDM and ISB were fed to have a given molar ratio (ISB/CHDM/DPC=0.700/0.300/1.000). The internal temperature was set to 110° C., and the contents were stirred for 1 hour. The entire amount was transferred from the bottom to a second dissolution vessel (not shown) and held at an internal temperature of 110° C. for 2 hours. The mixed solution was discharged from the bottom and passed through a raw material filter 5b by a metering feed pump (not shown) and thereafter, calcium acetate monohydrate as a polycondensation catalyst was fed to account for 1.5 μmol per mol of all dihydroxy compounds. The thus-prepared mixed solution of raw materials was subjected to a polycondensation process, and a polycarbonate resin was produced in the same manner as in Example 1.

During the operation, raw materials were newly mixed in the first dissolution vessel and fed to the second dissolution vessel before raw materials in the second dissolution vessel ran out. The residence time in the second dissolution kept being prolonged until raw materials were newly fed and in this Comparative Example, the maximum residence time in the second dissolution vessel was 12 hours. Also, the time from mixing of ISB and DPC to feeding to the reactor was 720 minutes.

In the polycarbonate resin obtained as above, not only the color tone was worsened as compared with Example 1 but also when the pressure of the fourth horizontal stirring reactor 6d was adjusted so as to keep the molecular weight to a given range, the fluctuation range became broader than in Example 1. Furthermore, the degree of color instability of the obtained polycarbonate resin became wide. The results are shown in Table 3.

Comparative Example 2

The preparation was performed in the same manner as in Example 1 except that various conditions were set as shown in Table 3 to give a residence time of 6 hours in the dissolution vessel 1d and a residence time of 5 hours in the dissolution vessel 1g. The analysis values of ISB showed that as compared with Example 1, the contents of formic acid and furfural were increased, the reduction in pH or the degree of coloration was large, and the color tone of the mixture solution of raw materials was slightly worsened, suggesting progress of deterioration in the dissolution step.

Using raw materials prepared as above, the polymerization process was performed in the same manner as in Example 1. The color tone of the obtained polycarbonate resin was worsened as compared with Example 1. The results are shown in Table 3.

TABLE 2

|  | Temperature °C. | Pressure kPa | Average Residence Time minutes |
|---|---|---|---|
| 1st vertical stirring reactor | 190 | 26.7 | 80 |
| 2nd vertical stirring reactor | 195 | 20.0 | 45 |
| 3rd vertical stirring reactor | 215 | 7.5 | 30 |
| 4th horizontal stirring reactor | 230 | 0.5 | 90 |

TABLE 3

|  |  |  | Example 1 | Example 2 | Example 3 |
|---|---|---|---|---|---|
| First dissolution vessel | ISB Feed rate (B) | kg/hr | 29.8 | 29.8 | 29.8 |
|  | Liquid amount (A) | kg | 44.7 | 44.7 | 44.7 |
|  | A/B | — | 1.5 | 1.5 | 1.5 |
|  | Volume of content fluid (V) | $m^3$ | 0.034 | 0.034 | 0.034 |
|  | Contact area with heating medium (S) | $m^2$ | 0.191 | 0.191 | 0.191 |
|  | V/S |  | 0.18 | 0.18 | 0.18 |
|  | Internal temperature | °C. | 80 | 80 | 100 |
|  | Temperature of heating medium | °C. | 120 | 120 | 140 |
|  | Residence time | hr | 1.5 | 1.5 | 1.5 |
|  | Nitrogen bubbling | — | caused | none | caused |
|  | Oxygen concentration in vessel | ppm by volume | <500 | 1500 | <500 |
| Second dissolution vessel | ISB Feed rate | kg/hr | 29.8 | 29.8 | — |
|  | Liquid amount | kg | 44.7 | 44.7 | — |
|  | Internal temperature | °C. | 70 | 70 | — |
|  | Temperature of heating medium | °C. | 75 | 75 | — |
|  | Residence time | hr | 1.5 | 1.5 | — |
| Residence time from liquefaction of ISB to feeding to reactor |  | hr | 3 | 3 | 1.5 |
| ISB Analysis values at outlet of dissolution vessel | Formic acid content | ppm by weight | 0.7 | 1.7 | 1.5 |
|  | Furfural content | ppb by weight | 6 | 6 | 21 |
|  | pH | — | 7.2 | 6.1 | 6.3 |
|  | Solution YI | — | 0.34 | 0.65 | 0.61 |
| Mixed solution of raw materials | Elapse time* | min | <3 | <3 | <3 |
|  | Solution YI | — | 0.24 | 0.27 | 0.29 |
| Pressure adjustable range of fourth horizontal stirring reactor |  | kPa | 0.4-0.5 | 0.4-0.5 | 0.4-0.5 |
| Polycarbonate | Pellet YI | — | 8.5-9.1 | 9.3-10.3 | 8.8-9.5 |

|  |  |  | Comparative Example 1 | Comparative Example 2 |
|---|---|---|---|---|
| First dissolution vessel | ISB Feed rate (B) | kg/hr | — | 29.8 |
|  | Liquid amount (A) | kg | — | 178.8 |
|  | A/B | — | — | 6.0 |
|  | Volume of content fluid (V) | $m^3$ | — | 0.138 |
|  | Contact area with heating medium (S) | $m^2$ | — | 0.306 |
|  | V/S |  | — | 0.45 |
|  | Internal temperature | °C. | 110 | 80 |
|  | Temperature of heating medium | °C. | — | 110 |
|  | Residence time | hr | 1 | 6 |
|  | Nitrogen bubbling | — | caused | caused |
|  | Oxygen concentration in vessel | ppm by volume | <500 | <500 |
| Second dissolution vessel | ISB Feed rate | kg/hr | — | 29.8 |
|  | Liquid amount | kg | — | 149.0 |
|  | Internal temperature | °C. | 110 | 70 |
|  | Temperature of heating medium | °C. | — | 70 |
|  | Residence time | hr | 12 | 5 |
| Residence time from liquefaction of ISB to feeding to reactor |  | hr | 3 | 11 |
| ISB Analysis values at outlet of dissolution vessel | Formic acid content | ppm by weight | — | 2.5 |
|  | Furfural content | ppb by weight | — | 30 |
|  | pH | — | — | 5.8 |
|  | Solution YI | — | — | 0.85 |
| Mixed solution of raw materials | Elapse time* | min | 720 | <3 |
|  | Solution YI | — | 0.53 | 0.49 |
| Pressure adjustable range of fourth |  | kPa | 0.4-0.5 | 0.1-0.3 |

TABLE 3-continued

| | | | | |
|---|---|---|---|---|
| horizontal stirring reactor | | | | |
| Polycarbonate | Pellet YI | — | 13.2-17.1 | 15.0-16.3 |

*Time from mixing of ISB and DPC to feeding to reactor.

Example 4

A mixed solution of SPG, CHDM and DPC was prepared in the raw material preparation process shown in FIG. 1. Previously molten DPC was charged into a dissolution vessel 1d (the DPC feed line to the dissolution vessel 1d is not shown), and the internal temperature was kept at 180° C. When the internal temperature is less than 170° C., separation of SPG from DPC occurred to cause crystal precipitation, and the dissolution was difficult. SPG packaged in a flexible container was charged from a hopper 1b and after the inside of the hopper was purged with nitrogen, SPG and DPC were balanced by a measuring feeder (not shown) to have a predetermined molar ratio and charged into the dissolution vessel 1d. A nitrogen inlet tube was attached to the inside of the dissolution vessel 1d (not shown), and nitrogen having an oxygen concentration of 5 ppm by volume or less was blown into the liquid of the dissolution vessel 1d to cause bubbling. After stirring for 1 hour to dissolve SPG and DPC, the liquid level was adjusted to give a residence time of 1.5 hours by adjusting the liquid amount while controlling the degree of opening of a valve (not shown) provided in a discharge line at the bottom and at the same time, by continuously feeding molten DPC and solid SPG at predetermined flow rates. The mixed solution of SPG and DPC discharged from the bottom of the dissolution vessel 1d was fed to a dissolution vessel 1g (second dissolution vessel). The internal temperature and the residence time in the dissolution vessel 1g were adjusted to 175° C. and 1.5 hours, respectively. Molten SPG and DPC were continuously discharged from the bottom of the dissolution vessel 1g by a metering feed pump 1h, mixed with separately molten CHDM to have a given molar ratio (SPG/CHDM/DPC=0.700/0.300/1.005) and fed to a reactor.

The mixture solution of raw materials was fed to the reactor through a static mixer 5a and a raw material filter 5b. Before the reactor, calcium acetate monohydrate as a polycondensation catalyst was fed from a catalyst metering feed pump 4b to account for 30 µmol per mol of all dihydroxy compounds.

Subsequently, the mixture solution of raw materials was sent to the polycondensation process shown in FIG. 2, and a polycarbonate resin was produced under the following conditions by a continuous production apparatus having three vertical stirring reactors and one horizontal stirring reactor.

First, each reactor was previously set to the internal temperature/pressure according to the reaction conditions as shown in Table 4. Next, SPG, CHDM, DPC and the polycondensation catalyst mixed at a given molar ratio in the raw material preparation process were continuously fed to a first vertical stirring reactor 6a controlled to the ranges of ±5% of the predetermined temperature/pressure, and the liquid level was kept constant to give an average residence time of 80 minutes while controlling the degree of opening of a valve (not shown) provided in a polymer discharge line at the bottom.

The operation was optimized by adjusting the pressure of the fourth horizontal stirring reactor 6d so that the reduced viscosity at the outlet of the fourth horizontal stirring reaction can fall in the range of 0.70 to 0.73. The pressure adjustable range when performing the operation for 24 hours was from 0.3 to 0.4 kPa, and the pellet YI was changed in the range of 3 to 5. A polycarbonate resin with little fluctuation in molecular weight or color tone was obtained by an operation under nearly constant reaction conditions.

The results are shown in Table 5.

Comparative Example 3

The preparation was performed in the same manner as in Example 4 except that liquid amounts of the dissolution vessel 1d and the dissolution vessel 1g were set as shown in Table 5 to give a residence time of 6 hours in each of the dissolution vessel 1d and the dissolution vessel 1g, but in the fourth horizontal stirring reactor 6d, the stirring blade became tangled in the molten resin, making it difficult to withdraw the resin, and pelletization could not be achieved. The obtained resin was insoluble in methylene chloride and could not be measured for the reduced viscosity. It is considered that since SPG stored in the molten state for a long time caused a ring-opening reaction, the resin was crosslinked and became a gel.

TABLE 4

| | Temperature ° C. | Pressure kPa | Average Residence Time minutes |
|---|---|---|---|
| 1st vertical stirring reactor | 190 | 26.7 | 80 |
| 2nd vertical stirring reactor | 195 | 15.0 | 45 |
| 3rd vertical stirring reactor | 215 | 3.0 | 30 |
| 4th horizontal stirring reactor | 230 | 0.4 | 90 |

TABLE 5

| | | | Example 4 | Comparative Example 3 |
|---|---|---|---|---|
| First dissolution vessel | SPG Feed rate (B) | kg/hr | 30.4 | 30.4 |
| | DPC Feed rate | kg/hr | 42.8 | 42.8 |
| | Liquid amount (A) | kg | 109.8 | 439.2 |
| | A/B | — | 3.6 | 14.4 |
| | Internal temperature | ° C. | 180 | 180 |
| | Temperature of heating medium | ° C. | 195 | 190 |
| | Residence time | hr | 1.5 | 6.0 |
| | Nitrogen bubbling | — | caused | caused |

TABLE 5-continued

|  |  |  | Example 4 | Comparative Example 3 |
|---|---|---|---|---|
|  | Oxygen concentration in vessel | ppm by volume | <500 | <500 |
| Second dissolution vessel | Feed rate of SPG/DPC mixed solution | kg/hr | 73.2 | 73.2 |
|  | Liquid amount | kg | 109.8 | 439.2 |
|  | Internal temperature | ° C. | 175 | 175 |
|  | Temperature of heating medium | ° C. | 170 | 173 |
|  | Residence time | hr | 1.5 | 6.0 |
| Residence time from liquefaction of SPG to feeding to reactor |  | hr | 3 | 12 |
| Mixed solution of raw materials | Elapse time | hr | 3 | 12 |
| Pressure adjustable range of fourth horizontal stirring reactor |  | kPa | 0.1-0.3 | 0.1-0.3 |
| Polycarbonate | Pellet YI |  | 3.2-4.1 | — (*) |

(*) A pellet could not be obtained.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2011-075386) filed on Mar. 30, 2011 and Japanese Patent Application (Patent Application No. 2011-075439) filed on Mar. 30, 2011, the contents of which are incorporated herein by way of reference.

EXPLANATIONS OF REFERENCE SIGNS

1a: ISB Flexible container, SPG flexible container
1b: ISB Receiving hopper, SPG receiving hopper
1c: Crusher
1d, 1g: ISB Dissolution vessel, SPG dissolution vessel
1e: Internal heat exchanger
1f: Upper-paddle-blade lower-anchor-blade stirring blade
1h: ISB Metering feed pump, SPG/DPC mixed solution metering feed pump
2a: CHDM Drum
2b: CHDM Feed pump
2c: CHDM Dissolution vessel
2d: CHDM Metering feed pump
3a: DPC Feed line
3b: DPC Metering feed pump
4a: Catalyst tank
4b: Catalyst metering feed pump
5a: Static mixer
5b: Raw material filter
6a: First vertical stirring reactor
6b: Second vertical stirring reactor
6c: Third vertical stirring reactor
6d: Fourth horizontal stirring reactor
7a, 7b, 7c: MAXBLEND Blade
7d: Two-shaft spectacle-shaped stirring blade
8a, 8b: Internal heat exchanger
9a, 9b: Gear pump
10a, 10b: Reflux condenser
11a, 11b: Reflux tube
12a, 12b, 12c, 12d: Distillation tube
13a, 13b, 13c, 13d: Condenser
14a, 14b, 14c, 14d: Decompressor
15a: Liquid distillate recovery tank

The invention claimed is:

1. A method for producing a polycarbonate resin, comprising a step of performing melt polycondensation by continuously feeding a dihydroxy compound (A) having a moiety represented by the following formula (1) in a part of the structure and a carbonic acid diester each in a liquid state to a reactor, wherein the residence time from liquefaction of said dihydroxy compound (A) to its feeding to the reactor is from 0.1 to 10 hours:

with the proviso excluding the case where the moiety represented by formula (1) is a moiety constituting a part of —CH$_2$—OH.

2. The method for producing a polycarbonate resin according to claim 1, wherein said dihydroxy compound (A) and a carboxylic acid diester are continuously fed to a reactor such that the elapse time after mixing them becomes less than 5 hours, or these are continuously fed without mixing but independently to a reactor.

3. The method for producing a polycarbonate resin according to claim 1, wherein said dihydroxy compound (A) is a compound having a cyclic ether structure.

4. The method for producing a polycarbonate resin according to claim 1, wherein said dihydroxy compound (A) as a solid is liquefied by feeding it to a dissolution vessel containing a liquid obtained by previously melting comprising said dihydroxy compound (A) that has been previously melted.

5. The method for producing a polycarbonate resin according to claim 1, wherein said aliphatic dihydroxy compound (A) is a compound represented by the following formula (2):

(2)

$$\text{HO} \cdots \begin{array}{c} \text{H} \\ \end{array} \begin{array}{c} \text{O} \\ \end{array} \cdots \text{OH}.$$

6. The method for producing a polycarbonate resin according to claim 4, wherein the internal temperature of said dissolution vessel is 120° C. or less and the difference between the internal temperature and the heating medium temperature is 50° C. or less.

7. The method for producing a polycarbonate resin according to claim 2, wherein said dihydroxy compound (A) and a carbonic acid diester are continuously fed to a reactor such that the elapse tome after mixing them becomes less than 30 minutes.

8. The method for producing a polycarbonate resin according to claim 1, wherein said dihydroxy compound (A) is a compound represented by the following formula (3) or (4):

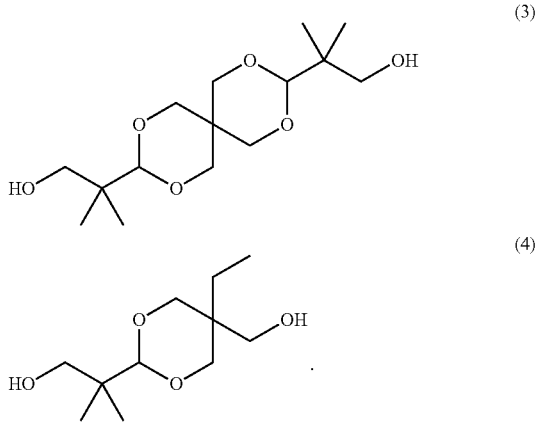

9. The method for producing a polycarbonate resin according to claim 8, wherein said compound represented by formula (3) or (4) as a solid is liquefied by feeding it to a dissolution vessel containing a liquid obtained by previously melting said carbonic acid diester.

10. The method for producing a polycarbonate resin according to claim 8, wherein the internal temperature of said dissolution vessel is 200° C. or less and the difference between the internal temperature and the heating medium temperature is 50° C. or less.

11. The method for producing a polycarbonate resin according to claim 4, wherein said solid dihydroxy compound (A) is continuously fed to said dissolution vessel and at the same time, the liquefied dihydroxy compound (A) is continuously discharged from said dissolution vessel.

12. The method for producing a polycarbonate resin according to claim 11, wherein assuming that the weight of the dihydroxy compound (A) held inside said dissolution vessel is A [kg] and the discharge flow rate of said dihydroxy compound (A) is B [kg/hr], the following formula (I) is satisfied:

$$0.05 \leq A/B \leq 5 \qquad (I).$$

13. The method for producing a polycarbonate resin according to claim 4, wherein said solid dihydroxy compound (A) fed to said dissolution vessel contains, per kg, 10 or less massive materials having a maximum length of 3 cm or more.

14. The method for producing a polycarbonate resin according to claim 4, wherein said dissolution vessel has a stirrer and a heat exchanger allowing a heating medium to flow therein.

15. The method for producing a polycarbonate resin according to claim 4, wherein assuming that the volume of the dihydroxy compound (A) held inside said dissolution vessel is V [m$^3$] and the contact area between said dihydroxy compound (A) and the heat exchanger is S [m$^2$], the following formula (II) is satisfied:

$$V/S \leq 0.3 \qquad (II).$$

16. The method for producing a polycarbonate resin according to claim 4, wherein said dihydroxy compound (A) is liquefied using two or more dissolution vessels connected in series and the temperature of said heating medium of the dissolution vessel on the downstream side is not more than the temperature of the heating medium of the dissolution vessel on the upstream side.

17. The method for producing a polycarbonate resin according to claim 4, wherein the oxygen concentration inside said dissolution vessel is 1,000 ppm by volume or less.

18. The method for producing a polycarbonate resin according to claim 4, wherein an inert gas containing 10 ppm by volume or less of oxygen is blown into the liquid of the dihydroxy compound (A) held in said dissolution vessel.

19. The method for producing a polycarbonate resin according to claim 4, wherein:
said dihydroxy compound (A) and a dihydroxy compound (B) other than said dihydroxy compound (A) are used as raw materials, and
said dihydroxy compound (B) is liquefied in a dissolution vessel different from a dissolution vessel in which said dihydroxy compound (A) is liquefied.

20. The method for producing a polycarbonate resin according to claim 19, wherein when the melting point of said dihydroxy compound (B) is higher than the melting point of a carbonic acid diester, said dihydroxy compound (B) as a solid is liquefied by feeding it to a liquid obtained by previously melting the carbonic acid diester.

21. The method for producing a polycarbonate resin according to claim 1, wherein all dihydroxy compounds and a carbonic acid diester used for the reaction are mixed by a static mixer and thereafter fed to a reactor.

22. The method for producing a polycarbonate resin according to claim 1, wherein all dihydroxy compounds and a carbonic acid diester used for the reaction are filtered through a filter and thereafter charged into a reactor.

23. The method for producing a polycarbonate resin according to claim 1, wherein said melt polycondensation is performed in the presence of a compound of at least one metal selected from metals belonging to Group 2 of the long-form periodic table and lithium.

24. The method for producing a polycarbonate resin according to claim 19, which is a method for continuously polycarbonate resin by using said dihydroxy compound (A) and said dihydroxy compound (B) as raw materials and comprises a composition switching step of changing the weight fraction of at least one dihydroxy compound out of the raw material composition fed to a reactor, based on all dihydroxy compounds, to a different weight fraction, wherein:
the difference between the weight fractions before and after said composition switching step is 1 wt % or more.

* * * * *